(12) United States Patent
Mera et al.

(10) Patent No.: US 7,524,603 B2
(45) Date of Patent: Apr. 28, 2009

(54) BINDER RESIN FOR ELECTROSTATIC IMAGE DEVELOPING TONER, BINDER RESIN LIQUID DISPERSION FOR ELECTROSTATIC IMAGE DEVELOPING TONER, ELECTROSTATIC IMAGE DEVELOPING TONER AND PRODUCTION PROCESSES THEREOF

(75) Inventors: Fumiaki Mera, Kanagawa (JP);
Hirotaka Matsuoka, Kanagawa (JP);
Satoshi Hiraoka, Kanagawa (JP); Yuki Sasaki, Kanagawa (JP); Yasuo Matsumura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 493 days.

(21) Appl. No.: 11/445,230

(22) Filed: Jun. 2, 2006

(65) Prior Publication Data

US 2007/0148579 A1 Jun. 28, 2007

(30) Foreign Application Priority Data

Dec. 26, 2005 (JP) ............................. 2005-371726

(51) Int. Cl.
*G03G 9/00* (2006.01)
(52) U.S. Cl. ............................. 430/109.4; 430/137.14; 430/124.1; 524/846; 524/611; 525/168
(58) Field of Classification Search .............. 430/109.4, 430/137.14, 124.1; 524/846, 611; 525/168
See application file for complete search history.

(56) References Cited

U.S. PATENT DOCUMENTS

2007/0281235 A1 12/2007 Ono et al.

FOREIGN PATENT DOCUMENTS

| | | |
|---|---|---|
| EP | 1 452 330 A2 | 1/2004 |
| JP | (A) 56-1952 | 1/1981 |
| JP | (A) 58-17452 | 2/1983 |
| JP | (A) 4-242752 | 8/1992 |
| JP | (A) 07-188523 | 7/1995 |
| JP | (A) 10-078679 | 3/1998 |
| JP | (A) 10-130380 | 5/1998 |
| JP | (A) 10-339969 | 12/1998 |
| JP | (A) 11-313692 | 11/1999 |
| JP | (A) 2001-051451 | 2/2001 |
| JP | (A) 2003-055302 | 2/2003 |
| JP | (A) 2003-261662 | 9/2003 |
| JP | (A) 2003-306535 | 10/2003 |
| JP | (A) 2004-217721 | 8/2004 |
| JP | (A) 2005-099122 | 4/2005 |
| WO | WO 2005/057293 A1 | 6/2005 |

OTHER PUBLICATIONS

Ishihara, Kazuaki, et al (Nov. 10, 2000). *Direct Condensation of Carboxylic Acids with Alcohols Catalyzed by Hafnium (IV) Salts.* Science, vol. 290, pp. 1140-1142.
Tanaka, Hozumi, et al (Feb. 17, 2003). *Synthesis of Polyesters by Emulsion Polycondensation Reaction in Water.* Polymer Journal, vol. 35, No. 4, pp. 359-363.

*Primary Examiner*—Mark A Chapman
(74) *Attorney, Agent, or Firm*—Oliff & Berridge, PLC

(57) ABSTRACT

A binder resin for an electrostatic image developing toner is obtained by a polycondensation reaction of a polycarboxylic acid and a polyol, wherein the polycarboxylic acid includes a compound represented by at least one of formula (1) and formula (2) as defined in the specification in an amount of from about 50 to about 100 mol %; the polyol includes a compound represented by formula (3) as defined in the specification in an amount of from about 10 to about 100 mol %; and a content of a catalyst-originated metal element in the binder resin is about 100 ppm or less $$R^1OOCA^1{}_mB^1{}_nA^1{}_rCOOR^{1'} \qquad (1)$$

$$R^2OOCA^2{}_pB^2{}_qA^2{}_rCOOR^{2'} \qquad (2)$$

$$HOX_h\text{-Ph-Y-Ph-}X_kOH \qquad (3).$$

19 Claims, No Drawings ously performed at a lower temperature as compared with a case using a vinyl-based polymer having a nearly equal softening temperature. Therefore, a polyester resin is being used as the binder resin for an energy-saving toner in many cases.

BINDER RESIN FOR ELECTROSTATIC IMAGE DEVELOPING TONER, BINDER RESIN LIQUID DISPERSION FOR ELECTROSTATIC IMAGE DEVELOPING TONER, ELECTROSTATIC IMAGE DEVELOPING TONER AND PRODUCTION PROCESSES THEREOF

BACKGROUND

1. Technical Field

The present invention relates to a binder resin for an electrostatic image developing toner which is used when an electrostatic latent image formed by an electro-photographic process, an electrostatic recording process or the like is developed with a developer, and also relates to an electrostatic image developing toner produced by kneading and pulverizing the binder resin. Furthermore, the present invention relates to a binder resin liquid dispersion for an electrostatic image developing toner, produced from the binder resin, and an electrostatic image developing toner produced by using the binder resin liquid dispersion. In addition, the present invention relates to an electrostatic image developer using the electrostatic image developing toner, and an image forming method.

2. Related Art

With rapid spread of digitization technology, high image quality is recently demanded for the output such as print and copy by users at the home or office or in the publishing field. Meanwhile, demands for low energy and energy saving in corporate activities and activity result products are increasing so as to realize a sustainable society. To keep up with this trend, also in the image forming method of forming an image, for example, by an electrophotographic process or an electrostatic recording process, there is required electric power saving in the fixing step which involves a large energy consumption, or implementation of an activity with a low environmental load in the step of producing a product by using the obtained material. Examples of the countermeasure for the former include more reduction in the toner fixing temperature. When the toner fixing temperature is lowered, in addition to power saving, the waiting time until the fixing member surface reaches the fixing possible temperature after turning on the power source, so-called warm-up time, can be shortened and the life of the fixing member can be prolonged.

Incidentally, as for the binder resin of a toner, a vinyl-based polymer has been heretofore widely used and for obtaining a fixing property in high temperature, use of a polymer having a high molecular weight has been proposed. However, a vinyl-based polymer having a high molecular weight has a high softening temperature and the heat roller must be set to a high temperature so as to obtain a fixed image with excellent glossiness, but this results in reverse movement against energy saving. Furthermore, a toner using a vinyl-based polymer is liable to be attacked by the plasticizer of a plasticized vinyl chloride and has a problem that on coming into contact with the plasticizer, the toner itself is plasticized to bear tackiness and contaminate the plasticized vinyl chloride product (hereinafter referred to as a "vinyl chloride resistance property").

On the other hand, a polyester resin has an excellent vinyl chloride resistance property, and a polyester resin having a low molecular weight can be relatively easily produced. Furthermore, a toner having blended therein a polyester resin as the binder resin is advantageous in that the toner when melted exhibits good wetting to a support such as transfer paper as compared with a toner having blended therein a vinyl-based polymer as the binder resin, and the fixing can be satisfactorily performed at a lower temperature as compared with a case As for the polyester binder resin, an amorphous polyester resin obtained by polycondensing mainly an aromatic polyvalent carboxylic acid (e.g., terephthalic acid, isophthalic acid), an aliphatic unsaturated carboxylic acid (e.g., fumaric acid, maleic acid), a diol having a bisphenol structure, and an alicyclic dial (e.g., aliphatic diol, cyclohexanedimethanol) has been heretofore used, and a large number of patents have been proposed thereon. Furthermore, studies are being made also on an alicyclic dicarboxylic acid such as cyclohexanedicarboxylic acid.

The above-described resins all are usually produced by a production process requiring a high energy. In a general polycondensation process, a reaction over 10 hours or more with stirring by a great power under highly reduced pressure at a high temperature exceeding 200° C. is necessary and a large energy consumption is incurred. Accordingly, a huge facility investment is required in many cases so as to obtain durability of the reaction facility.

In the case of producing a toner by using an amorphous polyester resin, a bisphenol A derivative is widely used as the alcohol monomer of the polyester. However, since this resin is also produced by using a metal catalyst, a metal is taken into the resin and when the toner is used in a severe environment such as high-temperature high-humidity condition, the charged amount decreases due to leakage of electric charge and fogging is readily generated in the non-image area.

On the other hand, higher function, particularly, higher-speed printing is demanded in an electrophotographic printer or copying machine, and even a print image printed under severe conditions is similarly required to satisfy not only the image storability under severe conditions, for example, at a high temperature for a long time, but also the image strength such as abrasion resistance and rubbing resistance.

A toner produced by using a bisphenol A derivative as the alcohol monomer of the polyester resin may satisfy the above-described requirements when used in a normal environment, but sufficient rigidity as a resin is not yet ensured in a severe environment such as high-temperature high-humidity condition and therefore, the mechanical strength as a toner powder or the image strength as a printed matter is still insufficient, for example, thinning or offset of an image due to strong friction is readily generated also in a printed matter from a toner produced by using the resin.

SUMMARY

According to an aspect of the invention, there is provided a binder resin for an electrostatic image developing toner, obtained by a polycondensation reaction of a polycarboxylic acid and a polyol, wherein the polycarboxylic acid includes a compound represented by at least one of formula (1) and formula (2) in an amount of from about 50 to about 100 mol %;

the polyol includes a compound represented by formula (3) in an amount of from about 10 to about 100 mol %; and a content of a catalyst-originated metal element in the binder resin is about 100 ppm or less:

$$R^1OOCA^1{}_mB^1{}_nA^1{}_lCOOR^{1\prime} \quad (1)$$

wherein $A^1$ represents a methylene group;

$B^1$ represents an aromatic hydrocarbon group;

$R^1$ and $R^{1\prime}$ each independently represents a hydrogen atom or a monovalent hydrocarbon group;

m and l each independently represents an integer satisfying $1 \leq m+l \leq 12$; and n represents an integer satisfying $1 \leq n \leq 3$;

$$R^2OOCA^2{}_pB^2{}_qA^2{}_rCOOR^{2'} \tag{2}$$

wherein $A^2$ represents a methylene group;

$B^2$ represents an alicyclic hydrocarbon group;

$R^2$ and $R^{2'}$ each independently represents a hydrogen atom or a monovalent hydrocarbon group; and p, q and r each independently represents an integer satisfying $0 \leq p \leq 6$, $0 \leq r \leq 6$ and $1 \leq q \leq 3$, respectively;

$$HOX_h\text{-Ph-Y-Ph-}X_kOH \tag{3}$$

wherein X represents an alkylene oxide group;

Y represents $SO_2$ or $C_6H_{10}$; and h and k each independently represents an integer satisfying $1 \leq h \leq 3$ and $1 \leq k \leq 3$, respectively.

DETAILED DESCRIPTION

The binder resin for an electrostatic image developing toner (in the present invention, the "electro-static image developing toner" is sometimes simply referred to as a "toner") of the present invention is a binder resin for a toner, obtained by the polycondensation reaction of a polycarboxylic acid and a polyol, wherein from about 50 to about 100 mol % of the polycarboxylic acid includes a compound represented by formula (1) and/or formula (2), from about 10 to about 100 mol % of the polyol includes a compound represented by formula (3), and the content of a catalyst-originated metal element in the resin is about 100 ppm or less:

$$R^1OOCA^1{}_mB^1{}_nA^1{}_lCOOR^{1'} \tag{1}$$

(wherein $A^1$ is a methylene group, $B^1$ is an aromatic hydrocarbon group, $R^1$ and $R^{1'}$ each is a hydrogen atom or a monovalent hydrocarbon group, $1 \leq m+l \leq 12$, and $1 \leq n \leq 3$);

$$R^2OOCA^2{}_pB^2{}_qA^2{}_rCOOR^{2'} \tag{2}$$

(wherein $A^2$ is a methylene group, $B^2$ is an alicyclic hydrocarbon group, $R^2$ and $R^{2'}$ each is a hydrogen atom or a monovalent hydrocarbon group, $0 \leq p \leq 6$, $0 \leq r \leq 6$, and $1 \leq q \leq 3$);

$$HOX_h\text{-Ph-Y-Ph-}X_kOH \tag{3}$$

(wherein X is an alkylene oxide group, Y is $SO_2$ or $C_6H_{10}$, $1 \leq h < 3$, and $1 \leq k \leq 3$).

In the conventional production process for an amorphous polyester resin, an amorphous polyester resin is produced by using a metal catalyst. According to an aspect of the present invention, a metal catalyst is not used and the amount of a metal element derived from the catalyst remaining in the resin is specified to about 100 ppm or less, whereby the background image can be free from fogging which is generated when a polyester resin is used for a toner and the toner is used in the high-temperature and high-humidity condition.

By virtue of the polycondensable monomer starting material having a specific composition, the mechanical strength as a toner powder and the image strength unachievable with use of a polyester resin obtained by polymerizing a conventionally used general-purpose monomer, can be realized.

Also, when the binder resin for a toner of the present invention is used, not only enhancement in the mechanical strength and image strength and improvement of background fogging in the non-image area under the high-temperature high-humidity condition are attained, but also by virtue of the elevated glass transition temperature of the resin, the hot offset property can be improved when a toner is produced by using this binder resin.

In the case where the acid component is changed from a monomer having a functional group directly bonded to an aromatic ring, such as terephthalic acid, to a monomer not coming under such a monomer so as to increase the reactivity of the polycarboxylic acid monomer, there may arise a problem that the inflexibility of the resin is lost. As a result, when a polyester obtained by using such an acid component is used for the production of a toner, the mechanical strength as a toner powder or the strength of the fixed image is sometimes decreased.

The present inventors have found that in order to solve this problem, when a bisphenol S derivative and/or a bisphenol Z derivative, which are an alcohol component having a low degree of free molecular motion and an inflexible structure, is incorporated as the alcohol component into the resin in place of or together with a bisphenol A derivative which has been heretofore widely used, the mechanical strength of the toner powder and the image strength can be improved. The present invention has been accomplished based on this finding.

The amount of the catalyst-originated metal element is about 100 ppm or less, preferably about 75 ppm or less, more preferably about 50 ppm or less, still more preferably about 10 ppm or less. The amount of the catalyst-originated metal element can be determined by shaping the binder resin for a toner and measuring the shaped sample by a fluorescent X-ray analyzer.

In the present invention, the polyester resin obtained by polycondensation is preferably an amorphous polyester resin.

With respect to the polyester resin for use in the electrostatic image developing toner of the present invention, the "crystalline" means that not a stepwise change of heat absorption but a distinct heat absorption peak appears in the differential scanning calorimetry (DSC), specifically, the half-width of the heat absorption peak measured at a temperature rising rate of 10° C./min is within 15° C.

On the other hand, the amorphous (non-crystalline) resin means a resin where the half-width exceeds 15° C. or a resin where a distinct heat absorption peak is not observed, and the amorphous resin for use in the present invention is preferably a resin where a distinct heat absorption peak is not observed.

In the present invention, the polycondensation reaction is performed by an esterification reaction (dehydration reaction) of a polycarboxylic acid and a polyol, or a transesterification reaction of a poly-carboxylic acid polyalkyl ester and a polyol. Either reaction may be used as the polycondensation reaction, but a polycondensation reaction using a polycarboxylic acid and a polyol and associated with a dehydration reaction is preferred.

In the polycarboxylic acid for use in the present invention, a compound (dicarboxylic acid) represented by formula (1) and/or formula (2) occupies from about 50 to about 100 mol %. In the present invention, the term "carboxylic acid" means a carboxylic acid including its esterified product and acid anhydride.

$$R^1OOCA^1{}_mB^1{}_nA^1{}_lCOOR^{1'} \tag{1}$$

(wherein $A^1$ is a methylene group, $B^1$ is an aromatic hydrocarbon group, $R^1$ and $R^{1'}$ each is a hydrogen atom or a monovalent hydrocarbon group, $1 \leq m+l \leq 12$, and $1 \leq n \leq 3$).

$$R^2OOCA^2{}_pB^2{}_qA^2{}_rCOOR^{2'} \tag{2}$$

(wherein $A^2$ is a methylene group, $B^2$ is an alicyclic hydrocarbon group, $R^2$ and $R^{2'}$ each is a hydrogen atom or a monovalent hydrocarbon group, $0 \leq p \leq 6$, $0 \leq r \leq 6$, and $1 \leq q \leq 3$).

The monovalent hydrocarbon group represents an alkyl group, an alkenyl group, an alkynyl group or an aryl group, and these groups each may have an arbitrary substituent. $R^1$, $R^{1'}$, $R^2$ and $R^{2'}$ each is preferably a hydrogen atom or a lower alkyl group, more preferably a hydrogen atom, a methyl group or an ethyl group, and most preferably a hydrogen atom.

Also, the aromatic hydrocarbon group in formula (1) and the alicyclic hydrocarbon group in formula (2) each may be substituted.

<Dicarboxylic Acid Represented by Formula (1)>

The dicarboxylic acid represented by formula (1) has at least one aromatic hydrocarbon group $B^1$, but the structure thereof is not particularly limited. Examples of the aromatic hydrocarbon group $B^1$ include, but are not limited to, benzene, naphthalene, acenaphthylene, fluorene, anthracene, phenanthrene, tetracene, fluoracene, pyrene, benzofluorene, benzophenanthrene, chrysene, triphenylene, benzopyrene, perylene, anthrathrene, benzonaphthacene, benzochrysene, pentacene, pentaphene and coronene structures. In these structures, a substituent may be further added.

The number of aromatic hydrocarbon groups $B^1$ contained in the dicarboxylic acid represented by formula (1) is from 1 to 3. If the number of aromatic hydrocarbon groups contained is less than 1, the polyester produced is deprived of the non-crystallinity, whereas if it exceeds 3, not only synthesis of such a dicarboxylic acid is difficult, giving rise to reduction in the efficiency of cost or production, but also reactivity decreases due to increase in the melting temperature or viscosity of the dicarboxylic acid represented by formula (1) or due to size or bulkiness of the dicarboxylic acid.

In the case where the dicarboxylic acid represented by formula (1) contains a plurality of aromatic hydrocarbon groups, the aromatic hydrocarbon groups may be directly bonded to each other, or another structure such as saturated aliphatic hydrocarbon group may intervene therebetween. Examples of the former include a biphenyl structure, and examples of the latter include a bisphenol A structure, a benzophenone structure and a diphenylethene structure, but the present invention is not limited thereto.

The aromatic hydrocarbon group $B^1$ is suitably a group having a structure in which the carbon number of the main structure is from C6 to C18. This carbon number of the main structure does not include the carbon number contained in the functional group bonded to the main structure. Examples of the structure include benzene, naphthalene, acenaphthylene, fluorene, anthracene, phenanthrene, tetracene, fluoracene, pyrene, benzofluorene, benzo-phenanthrene, chrysene, triphenylene and bisphenol A structures. Among these structures, preferred are benzene, naphthalene, anthracene and phenanthrene structures, and most preferred are benzene and naphthalene structures.

The carbon number of the main structure is preferably 6 or more, because the production of the monomer is easy. Also, the carbon number of the main structure is preferably 18 or less, because the molecular size of the monomer is appropriate and the reactivity does not decrease due to restricted molecular motion. Furthermore, the proportion of the reactive functional group in the monomer molecule is proper and advantageously, reduction in the reactivity does not occur.

The, dicarboxylic acid represented by formula (1) contains at least one or more methylene group $A^1$. The methylene group may be either linear or branched and, for example, a methylene chain, a branched methylene chain or a substituted methylene chain may be used. In the case of a branched methylene chain, the branched part is not limited in its structure and may have an unsaturated bond or may further have a branched or cyclic structure or the like.

The number of methylene groups $A^l$ is, in terms of the total m+l in the molecule, at least from 1 to 12. The total m+l is preferably from 2 to 6, and it is more preferred that m and l are the same number. If m+l is 0, that is, the dicarboxylic acid represented by formula (1) does not contain a methylene group, an aromatic hydrocarbon is directly bonded to a carboxyl group at both ends and in this case, the reaction intermediate formed by the catalyst and the dicarboxylic acid represented by formula (1) is resonance-stabilized and the reactivity decreases. Also, if m+l exceeds 12, the linear moiety becomes excessively large for the dicarboxylic acid represented by formula (1) and the polymer produced may have properties of a crystalline polymer or the glass transition temperature Tg may decrease.

The bonding site of the methylene group $A^1$ or carboxyl group to the aromatic hydrocarbon group $B^1$ is not particularly limited and may be opposition, m-position or p-position.

Examples of the dicarboxylic acid represented by formula (1) include, but are not limited to, 1,4-phenylenediacetic acid, 1,4-phenylenedipropionic acid, 1,3-phenylenediacetic acid, 1,3-phenylenedipropionic acid, 1,2-phenylenediacetic acid and 1,2-phenylenedipropionic acid. Among these, 1,4-phenylenedipropionic acid, 1,3-phenylene-dipropionic acid, 1,4-phenylenediacetic acid and 1,3-phenylenediacetic acid are preferred, and 1,4-phenylene-diacetic acid and 1,3-phenylenediacetic acid are more suitable for a toner.

In the dicarboxylic acid represented by formula (1), various functional groups may be added to any site of the structure. Also, the carboxylic acid group as the polycondensation reactive functional group may be an acid anhydride, an acid esterified product or an acid chloride. However, an intermediate of an acid esterified product and a proton is readily stabilized and tends to inhibit the reactivity and therefore, a carboxylic acid, a carboxylic acid anhydride or a carboxylic acid chloride is suitably used.

<Dicarboxylic Acid Represented by Formula (2)>

The dicarboxylic acid represented by formula (2) contains an alicyclic hydrocarbon group $B^2$. The alicyclic hydrocarbon structure is not particularly limited and examples thereof include, but are not limited to, cyclopropane, cyclobutane, cyclopentane, cyclohexane, cycloheptane, cyclooctane, cyclononane, cyclodecane, cycloundecane, cyclododecane, cyclopropene, cyclobutene, cyclopentene, cyclohexene, cycloheptene, cyclooctene, norbornene, adamantane, diamantane, triamantane, tetramantane, iceane, twistane and norbornene structures. In these substances, a substituent may be added. Considering the stability of the structure or the size or bulkiness of the molecule, cyclobutane, cyclopentane, cyclohexane, norbornene and adamantane are preferred.

The number of the alicyclic hydrocarbon groups contained in this monomer is at least from 1 to 3. If the number of the alicyclic hydrocarbon groups contained is less than 1, the produced polyester is deprived of non-crystallinity, whereas if it exceeds 3, the reactivity decreases due to increase in the melting temperature of the dicarboxylic acid represented by formula (2) or due to size or bulkiness of the molecule.

In the case of containing a plurality of alicyclic hydrocarbon groups, the dicarboxylic acid may take either a structure where the aromatic hydrocarbon groups are directly bonded to each other, or a structure where another structure such as saturated aliphatic hydrocarbon group intervenes therebetween. Examples of the former include a dicyclohexyl structure, and examples of the latter include a hydrogenated bisphenol A structure, but the present invention is not limited thereto.

The alicyclic hydrocarbon group is suitably a substance having a carbon number of C3 to C12. This carbon number of the main structure does not include the carbon number contained in the functional group bonded to the main structure. Examples thereof include substances having a cyclopropane, cyclobutane, cyclopentane, cyclohexane, cyclonaphthalene, acenaphthylene, fluorene, anthracene, phenanthrene, tetracene, fluoracene, pyrene, benzofluorene, benzophenanthrene, chrysene or triphenylene structure. Among these structures, preferred are cyclobutane, cyclopentane, cyclohexane, norbornene and adamantane.

The dicarboxylic acid represented by formula (2) may contain a methylene group $A^2$ in its structure. The methylene group may be either linear or branched and, for example, a methylene chain, a branched methylene chain or a substituted methylene chain may be used. In the case of a branched methylene chain, the branched part is not limited in its structure and may have an unsaturated bond or may further have a branched or cyclic structure or the like.

As for the number of methylene groups $A^2$, p and r each is 6 or less. If either one or both of p and r exceeds 6, the linear moiety becomes excessively large for the dicarboxylic acid represented by formula (2) and the polymer produced may have properties of a crystalline polymer or the glass transition temperature Tg may decrease.

The bonding site of the methylene group $A^2$ or carboxyl group to the alicyclic hydrocarbon group $B^2$ is not particularly limited and may be opposition, m-position or p-position.

Examples of the dicarboxylic acid represented by formula (2) include, but are not limited to, 1,1-cyclopropanedicarboxylic acid, 1,1-cyclobutanedicarboxylic acid, 1,2-cyclobutanedicarboxylic acid, 1,1-cyclopentenedicarboxylic acid, 1,4-cyclohexanedicarboxylic acid, 1,3-cyclohexanedicarboxylic acid, 1,2-cyclohexanedicarboxylic acid, 1,2-cyclohexenedicarboxylic acid, norbornene-2,3-dicarboxylic acid and adamantanedicarboxylic acid. Among these, preferred are substances having a cyclobutane, cyclohexane or cyclohexane structure, more preferred are 1,3-cyclohexanedicarboxylic acid and 1,4-cyclohexane-dicarboxylic acid.

In the dicarboxylic acid represented by formula (2), various functional groups may be added to any site of the structure. Also, the carboxylic acid group as the polycondensation reactive functional group may be an acid anhydride, an acid esterified product or an acid chloride. However, an intermediate of an acid esterified product and a proton is readily stabilized and tends to inhibit the reactivity and therefore, a carboxylic acid, a carboxylic acid anhydride or a carboxylic acid chloride is suitably used.

In the present invention, the compound (dicarboxylic acid) represented by formula (1) and/or formula (2) is contained in an amount of about 50 to about 100 mol % based on the entire polycarboxylic acid component. The compound represented by formula (1) and the compound represented by formula (2) may be used individually or in combination.

If the proportion of the compound represented by formula (1) and/or formula (2) is less than about 50 mol %, the reactivity in low-temperature polycondensation cannot be fully brought out and the molecular weight is not extended, as a result, a polyester having a low polymerization degree may be produced or a large number of residual polycondensation components may be mixed, giving rise to worsened flowability of the powder such as sticking of the binder resin at an ordinary temperature, or failure in obtaining a viscoelasticity or glass transition temperature suitable as the binder for a toner. The compound represented by formula (1) and/or formula (2) is preferably contained in a proportion of about 60 to about 100 mol %, more preferably from about 80 to about 100 mol %.

<Diol Represented by Formula (3)>

The binder resin for an electrostatic image developing toner of the present invention is a binder resin for a toner, obtained by the polycondensation reaction of a polycarboxylic acid and a polyol, wherein from about 10 to about 100 mol % of the polyol includes a compound (diol) represented by formula (3):

$$HOX_h\text{-Ph-Y-Ph-}X_k OH \qquad (3)$$

(wherein X is an alkylene oxide group, Y is $SO_2$ or $C_6H_{10}$, $1 \leq h \leq 3$, and $1 \leq k \leq 3$).

The diol represented by formula (3) is a bisphenol S derivative (Y: $SO_2$) or a bisphenol Z derivative (Y: $C_6H_{10}$).

One diol represented by formula (3) may be contained alone, or two or more kinds of diols represented by formula (3) may be contained. In this case, the total amount of diols represented by formula (3) is from about 10 to about 100 mol % based on the entire polyol.

Structures of the diol represented by formula (3) where X is an ethylene oxide and h=k=1 are shown below.

Bisphenol S Derivative (1 mol ethylene oxide adduct):

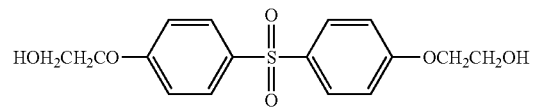

Bisphenol Z Derivative (1 mol ethylene oxide adduct):

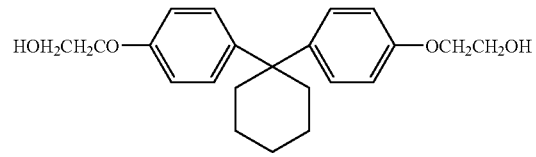

In the present invention, from about 10 to about 100 mol % of a bisphenol S derivative and/or a bisphenol Z derivative is used as the polyol component, whereby an electrostatic image developing toner excellent in the mechanical strength can be obtained.

In the case of a bisphenol A derivative, the molecular group in the moiety sandwiched by phenyl groups, that is, the $C(CH_3)_2$ group, has a high degree of free molecular motion and does not have an inflexible structure. On the other hand, in the case of a bisphenol Z derivative, the molecular group in the moiety sandwiched by phenyl groups, that is, the cyclohexane ring, is restricted in the molecular rotational motion as compared with the $C(CH_3)_2$ group, and the monomer itself has an inflexible structure as compared with the bisphenol A derivative. Therefore, the resin using this diol is considered to have excellent inflexibility.

Also, in the case of a bisphenol S derivative, the molecular group in the moiety sandwiched by phenyl groups, that is, the $SO_2$ group, has a rigid structure formed of double bonds and is restricted in the molecular motion. Therefore, when a polyester resin is produced by using a bisphenol S derivative, a strong resin is considered to be produced.

Furthermore, when a bisphenol S and/or bisphenol Z derivative having such an inflexible molecular structure is added in a specific amount as the alcohol component, the glass transition temperature of the resin increases, so that when a toner is produced by using this resin as the raw material, the hot offset property can be improved as compared with a toner produced from a resin in which such a diol is not added.

In the present invention, the diol represented by formula (3) contains at least one alkylene oxide group. Examples of the alkylene oxide group include, but are not limited to, an ethylene oxide group, a propylene oxide group and a butylene oxide group. Among these, ethylene oxide and propylene oxide are preferred, and ethylene oxide is more preferred.

The number h or k of alkylene oxide groups in one molecule is from 1 to 3. If the number of ethylene oxide groups is less than 1, that is, an alkylene oxide group is not added, an electron is delocalized due to resonance stabilization between a hydroxyl group and a phenyl group, and the nucleophilic attack on the polycarboxylic acid by the diol represented by formula (3) is weakened, as a result, extension of the molecular weight and progress of the polymerization degree are suppressed. On the other hand, if the number of alkylene oxide groups added exceeds 3, not only the linear moiety in the diol represented by formula (3) becomes excessively long and the polyester produced comes to have properties of a crystalline polyester, but also the number of reactive functional groups in the diol represented by formula (3) decreases and the reaction probability lowers.

From the standpoint of accelerating a uniform reaction, the numbers h and k of alkylene oxide groups are preferably the same number. Also, the numbers h and k of alkylene oxide groups each is preferably 2 or 1. In the case of containing two or more alkylene oxide groups, two or more kinds of alkylene oxide groups may be contained in one molecule.

Examples of the diol represented by formula (3) include, but are not limited to, a bisphenol Z ethylene oxide adduct (h and k each is from 1 to 3), a bisphenol Z propylene oxide adduct (h and k each is from 1 to 3), a bisphenol S ethylene oxide adduct (h and k each is from 1 to 3), a bisphenol S propylene oxide adduct (h and k each is from 1 to 3), and a bisphenol propylene oxide adduct (h and k each is from 1 to 3). In particular, a 1 mol ethylene oxide adduct of bisphenol Z (h and k each is 1) and a 1 mol ethylene oxide adduct of bisphenol S (h and k each is 1) are preferred.

In the present invention, the diol represented by formula (3) is contained in the polyol in a proportion of about 10 to about 100 mol %. If the content is about 10 mol % or less, sufficiently high mechanical strength and glass transition temperature suitable as a binder resin for a toner cannot be obtained.

The diol represented by formula (3) is preferably contained in -a proportion of about 20 to about 80 mol %, more preferably from about 30 to about 60 mol %.

<Catalyst>

In the present invention, a catalyst is preferably used at the polycondensation reaction.

The catalyst is preferably a sulfur acid.

(Sulfur Acid)

Examples of the sulfur acid include an inorganic sulfur acid and an organic sulfur acid. Examples of the inorganic sulfur acid include a sulfuric acid, a sulfurous acid and a salt thereof, and examples of the organic sulfur acid include sulfonic acids such as alkylsulfonic acid, arylsulfonic acid and salts thereof, and organic sulfuric acids such as alkylsulfuric acid, arylsulfuric acid and salts thereof.

The sulfur acid is preferably an organic sulfur acid, more preferably an organic sulfur acid having a surface activating effect. Incidentally, the acid having a surface activating effect is a compound having a chemical structure comprising a hydrophobic group and a hydrophilic group, in which at least a part of the hydrophilic group has an acid structure comprising a proton, and having both an emulsifying function and a catalyst function.

Examples of the organic sulfur acid having a surface activating effect include an alkylbenzenesulfonic acid, an alkylsulfonic acid, an alkyldisulfonic acid, an alkyl-phenolsulfonic acid, an alkylnaphthalenesulfonic acid, an alkyltetralinsulfonic acid, an alkylallylsulfonic acid, a petroleum sulfonic acid, an alkylbenzimidazolesulfonic acid, a higher alcohol ether sulfonic acid, an alkyldiphenyl-sulfonic acid, a long-chain alkylsulfuric acid ester, a higher alcohol sulfuric acid ester, a higher alcohol ether sulfuric acid ester, a higher fatty acid amide alkylol sulfuric acid ester, a higher fatty acid amide alkylated sulfuric acid ester, a sulfated fat, a sulfosuccinic acid ester, a resin acid alcohol sulfuric acid, and salt compounds of all of these sulfur acids. A plurality of these compounds may be used in combination, if desired. Among these compounds, a sulfonic acid having an alkyl or aralkyl group, a sulfuric acid ester having an alkyl or aralkyl group, and a salt compound thereof are preferred. The carbon number of the alkyl or aralkyl group is preferably 7 to 20. Specific examples of the organic sulfur acid include a dodecylbenzenesulfonic acid, an isopropylbenzenesulfonic acid, a comphorsulfonic acid, a p-toluenesulfonic acid, a monobutylphenylphenol sulfuric acid, a dibutyl-phenylphenol sulfuric acid, a dodecyl-sulfuric acid and a naphthenyl alcohol sulfuric acid.

The amount used of the sulfur acid usable in the present invention is preferably from about 0.05 to about 1.0 mol % based on the total weight of polycondensable monomers.

Another polycondensation catalyst commonly used may also be used in combination with the above-described sulfur acid catalyst or alone. Specific examples thereof include an acid having a surface activating effect, a metal catalyst, a hydrolase-type catalyst and a basic catalyst.

(Acid Having Surface Activating Effect)

Examples of the acid having a surface activating effect include various fatty acids, a higher alkyl-phosphoric acid ester, a resin acid, and salt compounds of all of these acids. A plurality of these acid catalysts may be used in combination, if desired.

(Metal Catalyst)

Examples of the metal catalyst include, but are not limited to, an organic tin compound, an organic titanium compound, an organic tin halide compound and a rare earth metal catalyst.

Specific examples of the effective rare earth-containing catalyst include those containing scandium (Sc), yttrium (Y), lanthanum (La) as the lanthanoid element, cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb) or lutetium (Lu). In particular, those having an alkylbenzenesulfonate, alkylsulfuric acid ester salt or triflate structure are effective. As for the triflate, examples of the structural formula include $X(OSO_2CF_3)_3$. X is a rare earth element and preferably scandium (Sc), yttrium (Y), ytterbium (Yb) or samarium (Sm)

The lanthanoid triflate is described in detail in Journal of Synthetic Organic Chemistry, Japan, Vol. 53, No. 5, pp. 44-54.

In the case of using a metal catalyst as the catalyst, the content of the catalyst-originated metal in the obtained resin is made to be about 100 ppm or less, preferably about 75 ppm or less, more preferably about 50 ppm or less. Accordingly, a metal catalyst is preferably not used or even if used, the metal catalyst is preferably used in a very slight amount.

(Hydrolase-Type Catalyst)

The hydrolase-type catalyst is not particularly limited as long as it catalyzes an ester synthesis reaction. Examples of the hydrolase for use in the present invention include an esterase classified into EC (enzyme code) Group 3.1 (see, for example, Maruo and Tamiya (supervisors), Koso Handbook (Handbook of Enzyme), Asakura-Shoten (1982)) such as carboxyesterase, lipase, phospholipase, acetylesterase, pectinesterase, cholesterol esterase, tannase, monoacyl-glycerol lipase, lactonase and lipoprotein lipase; a hydrolase classified into EC Group 3.2 capable of acting on a glycosyl compound, such as glucosidase, galactosidase, glucuronidase and xylosidase; a hydrolase classified into EC Group 3.3 such as epoxide hydrase; a hydrolase classified into EC Group 3.4 capable of acting on a peptide bond, such as aminopeptidase, chymotrypsin, trypsin, plasmin and subtilisin; and a hydrolase classified into EC Group 3.7 such as phloretin hydrase.

Among those esterases, an enzyme of hydrolyzing a glycerol ester and isolating a fatty acid is called a lipase. The lipase is advantageous, for example, in that this enzyme shows high stability in an organic solvent, catalyzes an ester synthesis reaction with good efficiency and is inexpensive. Accordingly, from the aspect of yield and cost, a lipase is preferably used also in the present invention.

Lipases of various origins may be used but preferred examples thereof include a lipase obtained from micro-organisms of *Pseudomonas* group, *Alcaligenes* group, *Achromobacter* group, *Candida* group, *Aspergillus* group, *Rhizopus* group and *Mucor* group, a lipase obtained from plant seeds and a lipase obtained from animal tissues, and further include pancreatin and steapsin. Among these, preferred is a lipase originated in microorganisms of *Pseudomonas* group, *Candida* group and *Aspergillus* group.

(Basic Catalyst)

Examples of the basic catalyst include, but are not limited to, a general organic base compound, a nitrogen-containing basic compound, and a tetraalkylphosphonium or tetraarylphosphonium hydroxide such as tetrabutylphosphonium hydroxide. Examples of the organic base compound include ammonium hydroxides such as tetramethylammonium hydroxide and tetraethylammonium hydroxide. Examples of the nitrogen-containing basic compound include amines (e.g., triethylamine, dibenzylmethylamine), pyridine, methylpyridine, methoxypyridine, quinoline, imidazole, a hydroxide, hydride or amide of alkali metals (e.g., sodium, potassium, lithium, cesium) or alkaline earth metals (e.g., magnesium, barium), and a salt of an alkali or alkaline earth metal with an acid, such as carbonate, phosphate, borate and carboxylate, or with a phenolic hydroxyl group.

Other examples include a compound with an alcoholic hydroxyl group, and a chelate compound with acetylacetone, but the present invention is not limited thereto.

The total amount added of the catalyst is preferably from about 0.01 to about 5 wt % based on the polycondensation components, and one species or a plurality of species is(are) preferably added in a proportion of about 0.05 to about 2 wt %.

In the present invention, the binder resin can be obtained even by performing the polycondensation reaction at a temperature lower than the conventional reaction temperature. The reaction temperature is preferably from about 70 to about 150° C., more preferably from about 80 to about 140° C.

The reaction temperature is preferably about 70° C. or more, because the reactivity does not decrease due to reduction in the solubility of monomer or in the catalytic activity and the extension of molecular weight is not inhibited. Also, the reaction temperature is preferably about 150° C. or less, because production with a low energy can be implemented and furthermore, coloration of the resin or decomposition or the like of the produced polyester does not occur.

For reducing in total the production energy of resin and the production energy of toner, it is very important to avoid the conventional high energy consumption-type production process and produce a polyester resin at a low temperature of about 150° C. or less. The polycondensation reaction has been heretofore performed at a high temperature exceeding about 200° C., and in order to perform the polymerization at a low temperature of about 150° C. or less, which is from several tens of ° C. to a hundred and several tens of ° C. lower than the conventional reaction temperature, a sulfur acid is suitably used, because the conventional metal catalyst such as Sn type and Ti type exhibits high catalytic activity particularly at about 200° C. or more and the activity thereof is very low at a low temperature of about 150° C. or less.

The catalytic activity or capacity of the sulfur acid decreases along the increase of temperature in the high temperature region of about 160° C. or more, but due to a reaction mechanism that the reaction proceeds starting from the nucleophilic addition of the catalyst acid, the sulfur acid exhibits high catalytic activity in the low polymerization temperature range of about 70° C. to about 150° C. and can be suitably used for a polycondensation reaction at about 150° C. or less.

Also, from the aspect of mechanical strength, a resin produced by using a sulfur acid catalyst is superior to a resin produced by using a metal catalyst. In the case of a sulfur acid catalyst, the polymerization proceeds by the nucleophilic addition reaction mechanism and therefore, possibility of mingling of an impurity is low, whereas in the case of a resin produced by using a metal catalyst such as Sn type or Ti type, the catalyst metal is readily taken into the resin because of the reaction mechanism that an acid and an alcohol are aggregated on the catalyst metal surface. When a metal having electrical conductivity is taken into the resin, the electric charge of the resin is liable to leak out, and when such a resin is used for a toner and particularly when printing is performed under the high-temperature high-humidity condition, leakage of electric charge readily occurs and this causes a problem that the charged amount is reduced and background fogging resulting from scattering of a toner also in the non-image area is readily generated. Furthermore, the metal taken into the resin is liable to cause a microstructural defect or the like in the resin.

On the other hand, when a sulfur acid catalyst is used, this is advantageous in that such mingling of a metal element can be suppressed, the leakage of electric charge hardly occurs even under the high-temperature high-humidity condition, and the background fogging is less generated.

Also in this respect, it is preferred to use a sulfur acid catalyst but not a metal catalyst.

The polycondensation reaction may be performed by a general polycondensation process such as bulk polymerization, emulsion polymerization, submerged polymerization (e.g., suspension polymerization), solution polymerization and interface polymerization, but bulk polymerization is preferred. Also, the reaction may be performed under atmospheric pressure, but when the purpose is to increase the molecular weight of the obtained polyester molecule, general conditions such as reduced pressure or nitrogen stream can be employed.

In the present invention, a step of rapidly cooling the resin after polymerization (rapid cooling step) is preferably further provided.

In the case of comprising a rapid cooling step, the polycondensation reaction may be performed by an emulsion polymerization process. After the polycondensation step, the rapid cooling is preferably performed at about 1 to about 50° C./min, more preferably from about 5 to about 50° C./min.

By performing the rapid cooling at about 1 to about 50° C./min, the change in the molecular arrangement at the interface between a particle and water or the thermal shrinkage is reduced and the surface area of a particle tends to be less changed than at gradual cooling, so that the dispersion stability and the storage stability can be enhanced. Furthermore, the produced resin particle can fast reach a temperature not more than its glass transition temperature and this is preferred because the generation of an aggregate due to collision of produced resin particles with each other can be prevented and the particles can be more stably present.

After the polycondensation step, the cooling is preferably performed to a temperature not more than the glass transition temperature of at least the resin and at the same time, to a temperature of about 40° C. or less, more preferably from about 5 to about 30° C. When cooled to about 40° C. or less, the produced resin particle comes to be present at a temperature not more than its glass transition temperature and this is advantageous in that the generation of an aggregate due to collision of resin particles with each other can be prevented and the particles can be more stably present.

The rapid cooling ways is not particularly limited but examples thereof include a method of dipping a reaction phase after emulsion polymerization in a cooling phase, thereby effecting rapid cooling, a method using, for example, a commercially available heat exchanger, and a method of performing the cooling while exchanging heat with a cooling water. The cooling rate can be determined by measuring the time required for the cooling to 40° C. from the initiation of cooling after the completion of polymerization and dividing the difference between the polymerization temperature and 40° C. by the time measured. In order to prevent the generation of an aggregate, the cooling rate is preferably higher.

Furthermore, in the bulk polymerization process, it is also a preferred embodiment to include a rapidly cooling step subsequently to an emulsification step performed after the polycondensation. In this case, the rapid cooling is preferably performed at about 1 to about 50° C./min, more preferably from about 5 to about 30° C./min.

By performing the rapid cooling at about 1 to about 50° C./min, the produced resin particle fast reaches a temperature not more than its glass transition temperature and this is preferred because the generation of an aggregate due to collision of produced resin particles with each other can be prevented and the particles can be more stably present. Also, the resin obtained by the bulk polycondensation and then emulsified is preferably cooled to about 40° C. or less, more preferably from about 5 to about 30° C. When cooled to about 40° C. or less, the produced resin particle comes to be present at a temperature not more than its glass transition temperature and this is advantageous in that the generation of an aggregate due to collision of resin particles with each other can be prevented and the particles can be more stably present. Furthermore, the produced resin particle fast reaches a temperature not more than its glass transition temperature and this is also preferred because the generation of an aggregate due to collision of produced resin particles with each other can be prevented and the particles can be more stably present.

In view of fixing property and image forming property, the binder resin for a toner of the present invention preferably has a glass transition temperature of about 30 to about 90° C. The glass transition temperature is preferably about 30° C. or more, because flowability of the toner powder at an ordinary temperature and the cohesive force of the binder resin itself in a high-temperature region are good and hot offset is not generated. Also, the glass transition temperature is preferably about 90° C. or less, because satisfactory melting and a good minimum fixing temperature are obtained.

The glass transition temperature is more preferably from about 40 to about 80° C., still more preferably from about 50 to about 70° C. The glass transition temperature can be controlled, for example, by the molecular weight or monomer constitution of the binder resin or by the addition of a crosslinking agent.

The glass transition temperature can be measured by a method prescribed in ASTM D3418-82 and is measured by means of a differential scanning calorimeter (DSC).

In order to impart suitability for a toner to the binder resin produced in the present invention, the weight average molecular weight is preferably from about 5,000 to about 50,000, more preferably from about 7,000 to about 35,000. The weight average molecular weight is preferably about 5,000 or more, because not only the powder flowability at an ordinary temperature is good and the toner is free from blocking but also the cohesive force as a toner binder resin is high and reduction in the hot offset property is not caused. Also, the weight average molecular is preferably about 50,000 or less, because good hot offset property and good minimum fixing temperature are obtained and the time or temperature required for the polycondensation is proper to ensure high production efficiency.

The weight average molecular weight can be measured, for example, by gel permeation chromatography (GPC).

The amorphous polyester of the present invention may be polycondensed together with polycondensation components other than those described above as long as the properties of the amorphous polyester are not impaired.

As for the polycarboxylic acid, a polyvalent carboxylic acid containing two or more carboxyl groups within one molecule may be used. Out of these carboxylic acids, a divalent carboxylic acid is a compound containing two carboxyl groups within one molecule, and examples thereof include an oxalic acid, a succinic acid, an itaconic acid, a glutaconic acid, a glutaric acid, a maleic acid, an adipic acid, a β-methyladipic acid, a suberic acid, an azelaic acid, a sebacic acid, a nonanedicarboxylic acid, a decanedicarboxylic acid, an undecanedicarboxylic acid, a dodecanedicarboxylic acid, a fumaric acid, a citraconic acid, a diglycolic acid, a malic acid, a citric acid, a hexahydroterephthalic acid, a malonic acid, a pimelic acid, a tartaric acid, a mucic acid, a phthalic acid, an isophthalic acid, a terephthalic acid, a tetrachlorophthalic acid, a chlorophthalic acid, a nitrophthalic acid, a biphenyl-p,p'-dicarboxylic acid, a naphthalene-1,4-dicarboxylic acid, a naphthalene-1,5-dicarboxylic acid, a naphthalene-2,6-dicarboxylic acid, an anthracene dicarboxylic acid, an n-dodecylsuccinic acid, an n-dodecenylsuccinic acid, an isododecylsuccinic acid, an isododecenylsuccinic acid, an n-octylsuccinic acid and an n-octenylsuccinic acid. Examples of the polyvalent carboxylic acid other than the divalent carboxylic acid include a trimellitic acid, a pyromellitic acid, a naphthalenetricarboxylic acid, a naphthalenetetracarboxylic acid, a pyrenetricarboxylic acid and a pyrenetetracarboxylic acid. The polycarboxylic acid used in combination is preferably a dicarboxylic acid which is a divalent carboxylic acid.

Other examples include an acid anhydride, an acid chloride and an acid esterified product of these carboxylic acids, but the present invention is not limited thereto.

As for the polyol (polyhydric alcohol), a polyol containing two or more hydroxyl groups within one molecule may be used. Out of these polyols, the divalent polyol (diol) is a compound having two hydroxyl groups within one molecule, and examples thereof include ethylene glycol, diethylene glycol, triethylene glycol, propylene glycol, butanediol, butenediol, neopentyl glycol, pentane glycol, hexane glycol, cyclohexanediol, cyclohexanedimethanol, octanediol, nonanediol, decanediol, dodecanediol, dipropylene glycol, polyethylene glycol, polypropylene glycol, polytetramethylene glycol, bisphenols (e.g., bisphenol A) except for bisphenols described above, and hydrogenated bisphenols. Examples of the polyol other than the divalent polyol include glycerin, pentaerythritol, hexamethylolmel amine, hexaethylolmelamine, tetramethylolbenzoguanamine and tetraethylolbenzoguanamine.

Among these, the polyol used in combination is preferably a diol which is a divalent polyol, more preferably bisphenol A.

The content of the polycarboxylic acid monomer is less than about 50 mol %, preferably about 40 mol % or less, more preferably about 20 mol % or less, based on the total amount of the polycarboxylic acid as the polycondensation component.

The content of the polyol monomer is less than about 90 mol %, preferably about 70 mol % or less, more preferably about 50 mol % or less, based on the total amount of the polyol as the polycondensation component.

When the content of the polycarboxylic acid or polyol monomer used in combination is within the above-described range, this is advantageous in that excellent low-temperature reactivity can be obtained because a polycarboxylic acid capable of enhancing the reactivity is contained and the glass transition of the resin is elevated by virtue of containing an appropriate amount of a polyol monomer having an inflexible molecular structure and also in that the toner produced by using the resin as the raw material can be improved in the hot offset property.

In the present invention, the polycondensation step may contain a polymerization reaction of the above-described polycarboxylic acid and polyol as the polycondensation components with a prepolymer which has been previously prepared. The prepolymer is not limited as long as it is a polymer capable of being dissolved or uniformly mixed in those monomers.

Furthermore, the binder resin of the present invention may contain, for example, a homopolymer of the above-described polycondensation component, a copolymer comprising a combination of two or more monomers including the above-described polymerizable component, or a mixture, graft polymer, partially branched or crosslinked structure thereof.

Using the binder resin for a toner produced by the present invention, a toner may be produced by a mechanical production process such as melt-kneading pulverization method, or by a so-called chemical production process of preparing a binder resin liquid dispersion (in the present invention, sometimes also referred to as a "binder resin particle liquid dispersion" or a "resin particle liquid dispersion") by the use of the polyester and then producing a toner from the binder resin liquid dispersion.

When a toner is produced by using the binder resin of the present invention according to a mechanical production process such as melt-kneading method, good dispersibility or pulverizability of a pigment or the like is assured. The reasons therefor are considered because a polycondensation component exhibiting high reactivity at a low temperature is contained as the main component and the polycondensation can be performed at a temperature lower than that in the conventional polycondensation reaction, so that the production of a by-product or unreacted product can be suppressed and a binder resin uniform in the physical properties can be obtained.

In the case of producing a toner by a melt-kneading pulverization method, the polyester resin produced as above is preferably stirred and mixed with other toner raw materials in a Henschel mixer, a super mixer or the like before the melt kneading. At this time, the capacity of stirrer, the rotation speed of stirrer, the stirring time and the like must be selected in combination.

The product after stirring the binder resin for a toner with other toner raw materials is then kneaded in the melted state by a known method. Kneading by a single-screw or multiple-screw extruder is preferred, because the dispersibility is enhanced. At this time, the number of kneading screw zones, the cylinder temperature, the kneading speed and the like of the kneading apparatus all must be set and controlled to appropriate values. Out of the controlling factors at the kneading, the rotation number of kneader, the number of kneading screw zones and the cylinder temperature have particularly a great effect on the kneaded state. In general, the rotation number is preferably from about 300 to about 1,000 rpm and as for the number of kneading screw zones, kneading can be more successfully performed by using a multi-stage zone such as two-stage screw, rather than a one-stage zone. The cylinder preset temperature is preferably determined by the softening temperature of the amorphous polyester working out to the main component of the binder resin and usually, this temperature is preferably on the order of about −20 to about +100° C. of the softening temperature. A cylinder preset temperature in this range is preferred, because not only satisfactory kneading-dispersion is obtained and aggregation is not generated but also kneading shear is applied to ensure satisfactory dispersion and at the same time, cooling after kneading is facilitated.

The kneaded product after melt-kneading is thoroughly cooled and then pulverized by a known method such as mechanical pulverization method (e.g., ball mill, sand mill, hammer mill) or airflow pulverization method. In the case where satisfactory cooling cannot be attained by a normal method, a cooling or freeze pulverization method may also be selected.

For the purpose of controlling the particle size distribution of the toner, the toner after pulverization may be classified. The classification has an effect of removing particles having an improper diameter and thereby enhancing the fixing property of toner or the image quality.

On the other hand, to cope with recent demands for high image quality, many chemical production processes of a toner are employed as a technique for realizing a low-energy production process of a toner with a small diameter. As for the chemical production process of a toner using the binder resin for a toner of the present invention, a general-purpose production process may be used, but an aggregation-coalescence method is preferred. The aggregation-coalescence method is a known aggregation method of producing a latex by dispersing the binder resin in water and aggregating (associating) it together with other toner raw materials.

The method of dispersing the binder resin produced as above in water is not particularly limited and may be selected from known methods such as forced emulsification method, self-emulsification method and phase-inversion emulsification method. Among these, a self-emulsification method and a phase-inversion emulsification method are preferred in view of the energy required for emulsification, the controllability of particle diameter of the emulsified product, the safety and the like.

The self-emulsification method and phase-inversion emulsification method are described in Chobiryushi Polymer no Oyo Gijutsu (Applied Technology of Ultrafine Particulate Polymer), CMC. As for the polar group used in the self-emulsification method, a carboxyl group, a sulfone group or the like may be used, but when the self-emulsification is applied to the amorphous polyester binder resin for a toner of the present invention, a carboxyl group is preferred.

Using the thus-produced binder resin liquid dispersion (also referred to as a "binder resin particle liquid dispersion"), that is, so-called latex, a toner controlled in the toner particle diameter and distribution can be produced by an aggregation (association) method. More specifically, a latex produced as above is mixed with a colorant particle liquid dispersion and a releasing agent particle liquid dispersion, a coagulant is added to generate hetero-aggregation and thereby form an aggregate particle having a toner size, and the aggregate particles are fused and coalesced under heating to a temperature higher than the glass transition temperature or melting temperature of the binder resin particle, then washed and dried to obtain a toner. In this production process, the toner shape from amorphous to spherical can be controlled by selecting the heating temperature condition.

After the completion of the fusion and coalescence step of aggregate particles, a washing step, a solid-liquid separation step and a drying step are arbitrarily performed to obtain a desired toner particle. When chargeability is taken account of, the washing step is preferably performed by thorough displacement and washing with ion exchanged water. The solid-liquid separation step is not particularly limited but in view of productivity, suction filtration, pressure filtration and the like are preferred. The drying step is also not particularly limited but in view of productivity, freeze drying, flash jet drying, fluidized drying, vibration-type fluidized drying and the like are preferred.

As for the coagulant, a surfactant, an inorganic salt or a divalent or higher metal salt may be suitably used. In particular, a metal salt is preferred in view of aggregation control and properties such as toner chargeability. The metal salt compound used for the aggregation is obtained by dissolving a general inorganic metal compound or a polymer thereof in the resin particle liquid dispersion, and the metal element constituting the inorganic metal salt is preferably a metal element having a divalent or higher electric charge and belonging to Groups 2A, 3A, 4A, 5A, 6A, 7A, 8, 1B, 2B and 3B of the Periodic Table (long Periodic Table) and may be sufficient if it dissolves in the form of an ion in the aggregation system of resin particles. Specific preferred examples of the inorganic metal salt include a metal salt such as calcium chloride, calcium nitrate, barium chloride, magnesium chloride, zinc chloride, aluminum chloride and aluminum sulfate, and an inorganic metal salt polymer such as polyaluminum chloride, polyaluminum hydroxide and calcium polysulfide. Among these, an aluminum salt and a polymer thereof are preferred. Generally, in order to obtain a sharper particle size distribution, the valence of the inorganic metal salt is preferably divalence rather than monovalence and preferably trivalence or higher rather than divalence. When the valence is the same, a polymerization-type inorganic metal salt polymer is more preferred.

In the present invention, if desired, one or a combination of a plurality of known additives may be blended within the range of not affecting the effects of the present invention. Examples of the additive include a flame retardant, a flame retardant aid, a gloss agent, a waterproof agent, a water repellent, an inorganic filler (surface modifier), a releasing agent, an antioxidant, a plasticizer, a surfactant, a dispersant, a lubricant, a filler, an extender pigment, a colorant, a binder and a charge-control agent. These additives may be blended in any step during the production of an electrostatic image developing toner.

As for the internal additive, various charge control agents commonly used, such as quaternary ammonium salt compound and nigrosine-based compound, may be used as the charge control agent but in view of stability at the production and less contamination by waste water, a material hardly soluble in water is preferred.

Examples of the releasing agent which can be used include low molecular weight polyolefins such as polyethylene, polypropylene and polybutene; silicones having a softening temperature at which softening occurs under heat; fatty acid amides such as oleic acid amide, erucic acid amide, ricinoleic acid amide and stearic acid amide; an ester wax; a vegetable wax such as carnauba wax, rice wax, candelilla wax, Japan wax and jojoba oil; an animal wax such as bees wax; a mineral or petroleum wax such as montan wax, ozokerite, ceresin, paraffin wax, microcrystalline wax and Fischer-Tropsch wax; and a modified product thereof.

Such a wax is dispersed in water together with an ionic surfactant and a polymer electrolyte such as polymer acid or polymer base, and pulverized under heating to a temperature higher than the melting temperature in a homogenizer or pressure jet-type disperser capable of applying strong shear, whereby a liquid dispersion of particles of about 1 μm or less can be produced.

Examples of the flame retardant and flame retardant aid include, but are not limited to, a bromine-based flame retardant already used in general, antimony trioxide, magnesium hydroxide, aluminum hydroxide and ammonium polyphosphate.

As for the coloring component (colorant), any known pigment or dye may be used. Specific examples thereof include a carbon black such as furnace black, channel black, acetylene black and thermal black; an inorganic pigment such as red iron oxide, iron blue and titanium oxide; an azo pigment such as Fast Yellow, Disazo Yellow, pyrazolone red, chelate red, Brilliant Carmine and Para Brown; a phthalocyanine pigment such as copper phthalocyanine and nonmetal phthalocyanine; a condensation polycyclic pigment such as flavanthrone yellow, dibromoanthrone orange, perylene red, Quinacridone Red and Dioxazine Violet; and various pigments such as chrome yellow, Hansa Yellow, Benzidine Yellow, Indanthrene Yellow, Quinoline Yellow, Permanent Orange GTR, Pyrazolone Orange, Vulcan Orange, Watchung Red, Permanent Red, DuPont Oil Red, Lithol Red, Rhodamine B Lake, Lake Red C, Rose Bengal, Aniline Blue, Ultramarine Blue, Carco Oil Blue, Methylene Blue Chloride, Phthalocyanine Blue, Phthalocyanine Green,. Malachite Green Oxalate, C.I. Pigment Red 48:1, C.I. Pigment Red 122, C.I. Pigment Red 57:1, C.I. Pigment Yellow 12, C.I. Pigment Yellow 97, C.I. Pigment Yellow 17, C.I. Pigment Blue 15:1 and C.I. Pigment Blue 15:3. One or a combination of two or more of these pigments may be used.

Similarly to the normal toner, an inorganic particle such as silica, alumina, titania and calcium carbonate, or a fine resin particle such as vinyl-based resin, polyester and silicone, may be used as a flowability aid or a cleaning aid by adding (externally adding) it in the dry state under shearing to the surface of the toner after drying.

Examples of the surfactant used in the process of the present invention include an anionic surfactant such as sulfuric ester salt type, sulfonate type, phosphoric ester type and soap type; and a cationic surfactant such as amine salt type and quaternary ammonium salt type. It is also effective to use a nonionic surfactant in combination, such as polyethylene glycol type, alkylphenol ethylene oxide adduct type and polyhydric alcohol type. As for the dispersing means, a generally employed device such as rotation shearing homogenizer and media-containing ball mill, sand mill or dynomill, may be used.

The toner of the present invention preferably has a volume average particle diameter ($D_{50}$) of about 3.0 to about 20.0 µm, more preferably from about 3.0 to about 9.0 µm. $D_{50}$ is preferably about 3.0 µm or more, because an appropriate adhesive force is obtained and the developability does not decrease. Also, $D_{50}$ is preferably about 20.0 µm or less, because sufficiently high image resolution is obtained. The volume average particle diameter ($D_{50}$) can be measured by using a laser diffraction-type particle size distribution measuring device or the like.

Furthermore, the toner of the present invention preferably has a volume average particle size distribution index GSDv of about 1.4 or less. Particularly, in the case of a chemical process toner, GSDv is more preferably about 1.3 or less.

When a cumulative distribution of each volume is drawn from the small diameter side with respect to the particle size range (channel) divided on the basis of particle size distribution, the particle diameter at 16% accumulation is defined as $D_{16V}$ and the particle diameter at 84% accumulation is defined as $D_{84V}$. Using these, the volume average particle size distribution index (GSDv) is calculated according to the following formula:

$$\text{Volume average particle size distribution index } GSDv = (D_{84V}/D_{16V})^{0.5}$$

When the GSDv is about 1.4 or less, uniform particle diameter and good fixing property are obtained and the apparatus is advantageously free from a trouble ascribable to fixing failure. Also, scattering of the toner causing contamination in the apparatus or deterioration of the developer does not occur and this is preferred.

The volume average particle size distribution index GSDv can be measured by using a laser diffraction-type particle size distribution measuring device or the like.

In the case of producing the toner of the present invention by a chemical production process, from the standpoint of image forming property, the shape factor SF1 is preferably from about 100 to about 140, more preferably from about 110 to about 135. At this time, SF1 is calculated as follows.

$$SF1 = \frac{(ML)^2}{A} \times \frac{\pi}{4} \times 100$$

wherein ML represents an absolute maximum length of the particle and A represents a projected area of the particle.

These are quantified mainly by inputting a microscopic image or a scanning electron microscopic image into a Luzex image analyzer, and analyzing the image.

(Electrostatic Image Developer)

The electrostatic image developing toner of the present invention is used as an electrostatic image developer. This developer is not particularly limited as long as it contains the electrostatic image developing toner, and may take an appropriate component composition according to the purpose. When the electrostatic image developing toner is used alone, the developer is prepared as a one-component system electrostatic image developer, whereas when the toner is used in combination with a carrier, the developer is prepared as a two-component system electrostatic image developer.

The carrier is not particularly limited, but examples of the carrier usually employed include a magnetic particle such as iron powder, ferrite, iron oxide powder and nickel; a resin-coated carrier obtained by coating the surface of a magnetic particle as a core material with a resin such as styrene-based resin, vinyl-based resin, ethylene-based resin, rosin-based resin, polyester-based resin and melamine-based resin or with a wax such as stearic acid to form a resin coat layer; and a magnetic material dispersion-type carrier obtained by dispersing magnetic particles in a binder resin. Among these, a resin-coated carrier is preferred because the chargeability of the toner or the resistance of the entire carrier can be controlled by the constitution of the resin coat layer.

The mixing ratio between the toner of the present invention and the carrier in the two-component system electrostatic image developer is usually from about 2 to about 10 parts by weight of toner per 100 parts by weight of carrier. The preparation method of the developer is not particularly limited, but examples thereof include a method of mixing the toner and the carrier by a V blender.

(Image Forming Method)

The electrostatic image developing toner and electrostatic image developer of the present invention may be used for an image forming method in a normal electrostatic image developing system (electrophotographic system).

The image forming method of the present invention is an image forming method comprising a latent image-forming step of forming an electrostatic latent image on the surface of a latent image-holding member, a development step of developing the electrostatic latent image formed on the surface of the latent image-holding member with a developer containing a toner to form a toner image, a transfer step of transferring the toner image formed on the surface of the latent image-holding member to the surface of a transferee member, and a fixing step of heat-fixing the toner image transferred to the surface of the transferee member, wherein the toner is the electrostatic image developing toner of the present invention, or the developer is the electrostatic image developer of the present invention.

The above-described steps all may utilize the steps known in the image forming method, for example, the steps described in JP-A-56-40868 and JP-A-49-91231. Also, the image forming method of the present invention may include a step other than those steps, and preferred examples of such a step include a cleaning step of removing the electrostatic image developer remaining on the electrostatic latent image-supporting member. In a preferred embodiment, the image forming method of the present invention further includes a recycling step. This recycling step is a step of transferring the electrostatic image developing toner recovered in the cleaning step to the developer tank. The image forming method in this embodiment comprising a recycling step can be performed by using an image forming apparatus such as toner recycling system-type copying machine or facsimile machine. The image forming method of the present invention may also be applied to a recycling system in which the cleaning step is omitted and the toner is recovered simultaneously with the development.

As for the latent image-holding member, for example, an electrophotographic photoreceptor or a dielectric recording material may be used.

In the case of an electrophotographic photoreceptor, the surface of the electrophotographic photoreceptor is uniformly charged by a corotron charging device, a contact charging device or the like and then exposed to form an electrostatic latent image (latent image-forming step). Thereafter, the photoreceptor is caused to come in contact with or close to a developing roller having formed on the surface thereof a developer layer to allow for attachment of toner particles to the electrostatic latent image, thereby forming a toner image on the electrophotographic photoreceptor (development step). The toner image formed is transferred to the surface of a transferee member such as paper by using a corotron charging device or the like (transfer step). Furthermore, the toner image transferred to the surface of the transferee member is heat-fixed by a fixing machine to form a final toner image (fixing step).

At the heat-fixing by a fixing machine, a releasing agent is usually supplied to the fixing member of the fixing machine so as to prevent offset or the like.

EXAMPLES

The abbreviations of compounds used in Examples are as follows.

(Dicarboxylic Acid)
CHDA=1,4-cyclohexanedicarboxylic acid
PDAA=1,4-phenylenediacetic acid (Diol)
BPA-1EO=1 mol ethylene oxide adduct of bisphenol A (in terms of both terminals, 2 mol adduct)
BPA-2EO=2 mol ethylene oxide adduct of bisphenol A (in terms of both terminals, 4 mol adduct)
BPA-1PO=1 mol propylene oxide adduct of bisphenol A (in terms of both terminals, 2 mol adduct)
BPS-1EO=1 mol ethylene oxide adduct of bisphenol S (in terms of both terminals, 2 mol adduct)
BPS-2EO=2 mol ethylene oxide adduct of bisphenol S (in terms of both terminals, 4 mol adduct)
BPZ-1EO=1 mol ethylene oxide adduct of bisphenol Z (in terms of both terminals, 2 mol adduct)

(Catalyst)
DBSA=dodecylbenzenesulfonic acid
SnBnO=dibutyltin oxide

<Production of Resin and Resin Particle Liquid Dispersion>.

(Production of Resin Particle Liquid Dispersion 1)

| | |
|---|---|
| BPA-1EO | 29.0 parts by weight |
| BPS-1EO | 3.45 parts by weight |
| CHDA | 17.5 parts by weight |
| DBSA | 0.073 parts by weight |

These materials are mixed and charged into a reactor equipped with a stirrer, and polycondensation is performed at a resin temperature of 120° C. for 20 hours in an open system, as a result, uniform and transparent Amorphous Polyester Resin 1 is obtained.

This resin is sampled in a small amount, and the following physical properties are measured.

Weight average molecular weight by GPC: 14,150
Glass transition temperature (on-set): 69° C.

In the measurement of the molecular weight, the weight average molecular weight Mw and the number average molecular weight Mn are measured under the conditions described below by gel permeation chromatography (GPC). The measurement is performed at a temperature of 40° C. by flowing a solvent (tetrahydrofuran) at a flow velocity of 1.2 ml/min, and injecting 3 mg as the sample weight of a tetrahydrofuran sample solution having a concentration of 0.2 g/20 ml. At the measurement of the molecular weight of a sample, the measurement conditions are selected such that the molecular weight of the sample is included in the range where a logarithm and a count number of a molecular weight in a calibration curve produced from several kinds of monodisperse polystyrene standard samples form a straight line.

In this connection, the reliability of the measurement results can be confirmed by the fact that an NBS706 polystyrene standard sample measured under the above-described conditions is found to have:

weight average molecular weight $Mw=28.8\times10^4$
number average molecular weight $Mn=13.7\times10^4$ As for the column of GPC, a column satisfying the conditions above, such as TSK-GEL, GMH (produced by Tosoh Corp.), is used.

The glass transition temperature Tg of the polyester is measured by using a differential scanning calorimeter (DSC50, manufactured by Shimadzu Corp.).

More specifically, the measurement is performed by a method where the temperature is elevated at 10° C./min from 0° C. to 150° C., held at 150° C. for 10 minutes, then lowered at 10° C./min from 150° C. to −10° C., held at −10° C. for 10 minutes, and thereafter elevated at 10° C./min from −10° C. to 150° C. In the present invention, an on-set value in the differential scanning heat distribution curve at the second temperature elevation time is used as the glass transition temperature.

The median diameter of the resin particle liquid dispersion of the present invention can be measured, for example, by a laser diffraction-type particle size distribution measuring device (LA-920, manufactured by Horiba Ltd.).

As another calculation method, the median diameter can also be confirmed from a cross-sectional TEM (transmission-type electron microscope) (1010, manufactured by CEOL) photograph by using osmication or the like.

In the calculation method of a median diameter by TEM photograph, after measuring the median diameter on arbitrary 10 particles in the TEM photograph and calculating an average value thereof, the median diameter may be determined by the scale conversion.

The median diameter of the resin particle liquid dispersion of the present invention is preferably from about 0.05 to about 2.0 μm, more preferably from about 0.05 to about 1.0 μm.

The median diameter of the resin particle is preferably about 0.01 μm or more, because the aggregating property at the particle formation is good to less produce a free resin particle and the viscosity of the system is hardly increased to allow for easy control of the particle diameter. Furthermore, the median diameter of the resin particle is preferably about 2.0 μm or less, because a coarse powder is less produced, a good particle size distribution is obtained, a releasing agent such as wax is hardly isolated and assured of good separability at the fixing, and the offset generation temperature does not decrease.

15 Parts by weight of the resin obtained as above is charged into a reactor similarly equipped with a stirrer, and 0.2 parts by weight of sodium dodecylbenzenesulfonate is added as the surfactant. Furthermore, 30 parts by weight of an aqueous 0.2 mol/L sodium hydroxide solution heated to 90° C. is added and while keeping at 90° C., the stirring is continued for 2 hours. Thereafter, 100 parts by weight of ion exchanged water heated to 80° C. is added and thoroughly mixed and stirred by a homogenizer (Ultra-Turrax T50, manufactured by IKA Works, Inc.), thereby dispersing the resin in water.

In this way, Amorphous Polyester Resin Particle Liquid Dispersion 1 having a particle median diameter of 210 min is obtained.

The particle diameter of the obtained resin particle liquid dispersion is measured by a laser diffraction-type particle size distribution measuring device (LA-920, manufactured by Horiba Ltd.) to obtain the median diameter.

(Production of Resin Particle Liquid Dispersion 2)

| BPZ-1EO | 33.7 parts by weight |
| CHDA | 16.3 parts by weight |
| DBSA | 0.135 parts by weight |

These materials are mixed and charged into a reactor equipped with a stirrer, and polycondensation is performed at a resin temperature of 120° C. for 20 hours in an open system, as a result, uniform and transparent Amorphous Polyester Resin 2 is obtained.

This resin is sampled in a small amount, and the following physical properties are measured.

Weight average molecular weight by GPC: 11,080
Glass transition temperature (on-set): 69° C.

15 Parts by weight of the resin obtained above is charged into a reactor similarly equipped with a stirrer, and 0.2 parts by weight of sodium dodecylbenzenesulfonate is added as the surfactant. Furthermore, 30 parts by weight of an aqueous 0.2 mol/L sodium hydroxide solution heated to 90° C. is added and while keeping at 90° C., the stirring is continued for 2 hours. Thereafter, 100 parts by weight of ion exchanged water heated to 80° C. is added and thoroughly mixed and stirred by a homogenizer (Ultra-Turrax T50, manufactured by IKA Works, Inc.), thereby dispersing the resin in water.

In this way, Amorphous Polyester Resin Particle Liquid Dispersion 2 having a particle median diameter of 200 nm is obtained.

(Production of Resin Particle Liquid Dispersion 3)

| BPA-1EO | 15.8 parts by weight |
| BPS-1EO | 16.9 parts by weight |
| CHDA | 17.3 parts by weight |
| DBSA | 0.356 parts by weight |

These materials are mixed and charged into a reactor equipped with a stirrer, and polycondensation is performed at a resin temperature of 120° C. for 20 hours in an open system, as a result, uniform and transparent Amorphous Polyester Resin 3 is obtained.

This resin is sampled in a small amount, and the following physical properties are measured.

Weight average molecular weight by GPC: 14,240
Glass transition temperature (on-set): 70° C.

15 Parts by weight of the resin obtained above is charged into a reactor similarly equipped with a stirrer, and 0.2 parts by weight of sodium dodecylbenzenesulfonate is added as the surfactant. Furthermore, 30 parts by weight of an aqueous 0.2 mol/L sodium hydroxide solution heated to 90° C. is added and while keeping at 90° C., the stirring is continued for 2 hours. Thereafter, 100 parts by weight of ion exchanged water heated to 80° C. is added and thoroughly mixed and stirred by a homogenizer (Ultra-Turrax T50, manufactured by IKA Works, Inc.), thereby dispersing the resin in water.

In this way, Amorphous Polyester Resin Particle Liquid Dispersion 3 having a particle median diameter of 220 nm is obtained.

(Production of Resin Particle Liquid Dispersion 4)

| BPA-1PO | 16.1 parts by weight |
| BPS-1EO | 16.9 parts by weight |
| PDAA | 18.4 parts by weight |
| DBSA | 0.132 parts by weight |

These materials are mixed and charged into a reactor equipped with a stirrer, and polycondensation is performed at a resin temperature of 120° C. for 20 hours in an open system, as a result, uniform and transparent Amorphous Polyester Resin 4 is obtained.

This resin is sampled in a small amount, and the following physical properties are measured.

Weight average molecular weight by GPC: 11,090
Glass transition temperature (on-set): 71° C.

15 Parts by weight of the resin obtained above is charged into a reactor similarly equipped with a stirrer, and 0.2 parts by weight of sodium dodecylbenzenesulfonate is added as the surfactant. Furthermore, 30 parts by weight of an aqueous 0.2 mol/L sodium hydroxide solution heated to 90° C. is added and while keeping at 90° C., the stirring is continued for 2 hours. Thereafter, 100 parts by weight of ion exchanged water heated to 80° C. is added and thoroughly mixed and stirred by a homogenizer (Ultra-Turrax T50, manufactured by IKA Works, Inc.), thereby dispersing the resin in water.

In this way, Amorphous Polyester Resin Particle Liquid Dispersion 4 having a particle median diameter of 190 nm is obtained.

(Production of Resin Particle Liquid Dispersion 5)

| BPA-1PO | 15.8 parts by weight |
| BPZ-1EO | 16.3 parts by weight |
| PDAA | 17.8 parts by weight |
| DBSA | 0.131 parts by weight |

These materials are mixed and charged into a reactor equipped with a stirrer, and polycondensation is performed at a resin temperature of 120° C. for 20 hours in an open system, as a result, uniform and transparent Amorphous Polyester Resin 5 is obtained.

This resin is sampled in a small amount, and the following physical properties are measured.

Weight average molecular weight by GPC: 10,060
Glass transition temperature (on-set): 69° C.

15 Parts by weight of the resin obtained above is charged into a reactor similarly equipped with a stirrer, and 0.2 parts by weight of sodium dodecylbenzenesulfonate is added as the surfactant. Furthermore, 30 parts by weight of an aqueous 0.2 mol/L sodium hydroxide solution heated to 90° C. is added and while keeping at 90° C., the stirring is continued for 2 hours. Thereafter, 100 parts by weight of ion exchanged water heated to 80° C. is added and thoroughly mixed and stirred by a homogenizer (Ultra-Turrax T50, manufactured by IKA Works, Inc.), thereby dispersing the resin in water.

In this way, Amorphous Polyester Resin Particle Liquid Dispersion 5 having a particle median diameter of 190 nm is obtained.

(Production of Resin Particle Liquid Dispersion 6)

| BPS-2EO | 34.3 parts by weight |
| PDAA | 15.7 parts by weight |
| DBSA | 0.118 parts by weight |

These materials are mixed and charged into a reactor equipped with a stirrer, and polycondensation is performed at a resin temperature of 120° C. for 20 hours in an open system, as a result, uniform and transparent Amorphous Polyester Resin 6 is obtained.

This resin is sampled in a small amount, and the following physical properties are measured.
  Weight average molecular weight by GPC: 18,250
  Glass transition temperature (on-set): 60° C.

15 Parts by weight of the resin obtained above is charged into a reactor similarly equipped with a stirrer, and 0.2 parts by weight of sodium dodecylbenzenesulfonate is added as the surfactant. Furthermore, 30 parts by weight of an aqueous 0.2 mol/L sodium hydroxide solution heated to 90° C. is added and while keeping at 90° C., the stirring is continued for 2 hours. Thereafter, 100 parts by weight of ion exchanged water heated to 80° C. is added and thoroughly mixed and stirred by a homogenizer (Ultra-Turrax T50, manufactured by IKA Works, Inc.), thereby dispersing the resin in water.

In this way, Amorphous Polyester Resin Particle Liquid Dispersion 6 having a particle median diameter of 190 nm is obtained.

(Production of Resin Particle Liquid Dispersion 7)

| BPS-1PO | 32.7 parts by weight |
| PDAA | 17.3 parts by weight |
| DBSA | 0.127 parts by weight |

These materials are mixed and charged into a reactor equipped with a stirrer, and polycondensation is performed at a resin temperature of 120° C. for 20 hours in an open system, as a result, uniform and transparent Amorphous Polyester Resin 7 is obtained.

This resin is sampled in a small amount, and the following physical properties are measured.
  Weight average molecular weight by GPC: 9,980
  Glass transition temperature (on-set): 71° C.

15 Parts by weight of the resin obtained above is charged into a reactor similarly equipped with a stirrer, and 0.2 parts by weight of sodium dodecylbenzenesulfonate is added as the surfactant. Furthermore, 30 parts by weight of an aqueous 0.2 mol/L sodium hydroxide solution heated to 90° C. is added and while keeping at 90° C., the stirring is continued for 2 hours. Thereafter, 100 parts by weight of ion exchanged water heated to 80° C. is added and thoroughly mixed and stirred by a homogenizer (Ultra-Turrax T50, manufactured by IKA Works, Inc.), thereby dispersing the resin in water.

In this way, Amorphous Polyester Resin Particle Liquid Dispersion 7 having a particle median diameter of 190 nm is obtained.

(Production of Resin Particle Liquid Dispersion 8)

| BPA-1EO | 31.0 parts by weight |
| PDAA | 19.03 parts by weight |
| DBSA | 0.131 parts by weight |

These materials are mixed and charged into a reactor equipped with a stirrer, and polycondensation is performed at a resin temperature of 120° C. for 20 hours in an open system, as a result, uniform and transparent Amorphous Polyester Resin 8 is obtained.

This resin is sampled in a small amount, and the following physical properties are measured.
  Weight average molecular weight by GPC: 21,080
  Glass transition temperature (on-set): 42° C.

15 Parts by weight of the resin obtained above is charged into a reactor similarly equipped with a stirrer, and 0.2 parts by weight of sodium dodecylbenzenesulfonate is added as the surfactant. Furthermore, 30 parts by weight of an aqueous 0.2 mol/L sodium hydroxide solution heated to 90° C. is added and while keeping at 90° C., the stirring is continued for 2 hours. Thereafter, 100 parts by weight of ion exchanged water heated to 80° C. is added and thoroughly mixed and stirred by a homogenizer (Ultra-Turrax T50, manufactured by IKA Works, Inc.), thereby dispersing the resin in water.

In this way, Amorphous Polyester Resin Particle Liquid Dispersion 8 having a particle median diameter of 200 nm is obtained.

(Production of Resin Particle Liquid Dispersion 9)

| BPA-2EO | 3.8 parts by weight |
| BPZ-1EO | 30.1 parts by weight |
| CHDA | 16.1 parts by weight |
| SnBnO | 0.15 parts by weight |

These materials are mixed and charged into a reactor equipped with a stirrer, and polycondensation is performed at a resin temperature of 120° C. for 20 hours in an open system, but the polymerization scarcely proceeded, as a result, a liquid with high viscosity at room temperature is obtained and an amorphous polyester resin cannot be obtained.

The liquid with high viscosity is sampled in a small amount (Resin 9), and the following physical properties are measured.
  Weight average molecular weight by GPC: 980
  Glass transition temperature (on-set): not more than room temperature.

Since a resin is not obtained here, the production of a resin particle liquid dispersion is not performed.

(Production of Resin Particle Liquid Dispersion 10)

| BPA-2EO | 17.6 parts by weight |
| BPZ-1EO | 15.5 parts by weight |
| PDAA | 16.9 parts by weight |
| SnBnO | 0.15 parts by weight |

These materials are mixed and charged into a reactor equipped with a stirrer, and polycondensation is performed at a resin temperature of 200° C. for 10 hours in an open system, as a result, uniform and transparent Amorphous Polyester Resin 10 is obtained.

This resin is sampled in a small amount, and the following physical properties are measured.

Weight average molecular weight by GPC: 21,600
Glass transition temperature (on-set): 63° C.

15 Parts by weight of the resin obtained above is charged into a reactor similarly equipped with a stirrer, and 0.2 parts by weight of sodium dodecylbenzenesulfonate, is added as the surfactant. Furthermore, 30 parts by weight of an aqueous 0.2 mol/L sodium hydroxide solution heated to 90° C. is added and while keeping at 90° C., the stirring is continued for 2 hours. Thereafter, 100 parts by weight of ion exchanged water heated to 80° C. is added and thoroughly mixed and stirred by a homogenizer (Ultra-Turrax T50, manufactured by IKA Works, Inc.), thereby dispersing the resin in water.

In this way, Amorphous Polyester Resin Particle Liquid Dispersion 10 having a particle median diameter of 210 nm is obtained.

(Production of Resin 11)

| | |
|---|---|
| BPA-1EO | 15.8 parts by weight |
| BPS-1EO | 16.9 parts by weight |
| CHDA | 17.3 parts by weight |
| SnBnO | 0.15 parts by weight |

These materials are mixed and charged into a reactor equipped with a stirrer, and polycondensation is performed at a resin temperature of 120° C. for 20 hours in an open. system, as a result, uniform and transparent Amorphous Polyester Resin 11 is obtained.

This resin is sampled in a small amount, and the following physical properties are measured.

Weight average molecular weight by GPC: 1,060
Glass transition temperature (on-set): not more than room temperature.

Since the glass transition temperature of Resin 11 is not more than room temperature and a satisfactory resin is not obtained, the production of a resin particle liquid dispersion is not performed.

(Production of Resin Particle Liquid Dispersion 12)

| | |
|---|---|
| BPA-1EO | 15.8 parts by weight |
| BPS-1EO | 16.9 parts by weight |
| CHDA | 17.3 parts by weight |
| SnBnO | 0.15 parts by weight |

These materials are mixed and charged into a reactor equipped with a stirrer, and polycondensation is performed at a resin temperature of 200° C. for 24 hours in an open system, as a result, uniform and transparent Amorphous Polyester Resin 12 is obtained.

This resin is sampled in a small amount, and the following physical properties are measured.

Weight average molecular weight by GPC: 21,600
Glass transition temperature (on-set): 70° C.

15 Parts by weight of the resin obtained above is charged into a reactor similarly equipped with a stirrer, and 0.2 parts by weight of sodium dodecylbenzenesulfonate is added as the surfactant. Furthermore, 30 parts by. weight of an aqueous 0.2 mol/L sodium hydroxide solution heated to 90° C. is added and while keeping at 90° C., the stirring is continued for 2 hours. Thereafter, 100 parts by weight of ion exchanged water heated to 80° C. is added and thoroughly mixed and stirred by a homogenizer (Ultra-Turrax T50, manufactured by IKA Works, Inc.), thereby dispersing the resin in water.

In this way, Amorphous Polyester Resin Particle Liquid Dispersion 12 having a particle median diameter of 220 nm is obtained.

<Preparation of Resin Particle Liquid Dispersion by Rapid Cooling Method>

(Preparation of Resin Particle Liquid Dispersion 13)

15 Parts by weight of Amorphous Polyester Resin Particle Liquid Dispersion 3 obtained above is charged into a reactor equipped with a stirrer, and 0.2 parts by weight of sodium dodecylbenzenesulfonate is added as the surfactant. Furthermore, 30 parts by weight of an aqueous 0.2 mol/L sodium hydroxide solution heated to 90° C. is added and while keeping at 90° C., the stirring is continued for 2 hours. Thereafter, 100 parts by weight of ion exchanged water heated to 80° C. is added and thoroughly mixed and stirred by a homogenizer (Ultra-Turrax T50, manufactured by IKA Works, Inc.), thereby dispersing the resin in water.

After the completion of emulsification, the emulsified liquid is dipped in a cooling phase and thereby cooled to produce a resin particle liquid dispersion. At this time, a thermometer is placed in the emulsified liquid and the cooling is performed so that the cooling temperature could become 5.0° C./min, as a result, uniform and transparent Amorphous Polyester Resin 1e is obtained.

In this way, Amorphous Polyester Resin Particle Liquid Dispersion 13 having a particle median diameter of 200 nm is obtained.

Incidentally, the amount of the catalyst-originated metal is measured by compression-molding the obtained resin and determining the amount of Sn element remaining in the resin by means of a fluorescent X-ray analyzer (System 3370, manufactured by Rigaku Corp.).

The properties of each of these binder resins for an electrostatic image developing toner and these resin particle liquid dispersions for an electrostatic image developing toner are shown in the Table below.

TABLE 1

| | Resin Particle Liquid Dispersion | Diol | Ratio | Dicarboxylic Acid | Ratio | Catalyst/Concentration |
|---|---|---|---|---|---|---|
| Example 1 | 1 | BPA-1EO/BPS-1EO | 90/10 | CHDA | 100 | DBSA/0.1 mol % |
| Example 2 | 2 | BPZ-1EO | 100 | CHDA | 100 | DBSA/0.2 mol % |
| Example 3 | 3 | BPA-1EO/BPS-1EO | 50/50 | CHDA | 100 | DBSA/0.5 mol % |
| Example 4 | 4 | BPA-1PO/BPS-1EO | 50/50 | PDAA | 100 | DBSA/0.2 mol % |
| Example 5 | 5 | BPA-1PO/BPZ-1EO | 50/50 | PDAA | 100 | DBSA/0.2 mol % |
| Example 6 | 6 | BPS-2EO | 100 | PDAA | 100 | DBSA/0.2 mol % |
| Example 7 | 7 | BPS-1PO | 100 | PDAA | 100 | DBSA/0.2 mol % |

TABLE 1-continued

| | | | | | | | |
|---|---|---|---|---|---|---|---|
| Comparative Example 1 | 8 | BPA-1EO | 100 | PDAA | 100 | DBSA/0.1 mol % | |
| Comparative Example 2 | 9 | BPA-2EO/BPZ-1EO | 10/90 | CHDA | 100 | SnBnO/0.5 mol % | |
| Comparative Example 3 | 10 | BPA-2EO/BPZ-1EO | 50/50 | PDAA | 100 | SnBnO/0.5 mol % | |
| Comparative Example 4 | 11 | BPA-1EO/BPS-1EO | 50/50 | CHDA | 100 | SnBnO/0.5 mol % | |
| Comparative Example 5 | 12 | BPA-1EO/BPS-1EO | 50/50 | CHDA | 100 | SnBnO/0.5 mol % | |
| Example 13 | 13 | BPA-1EO/BPS-1EO | 50/50 | CHDA | 100 | DBSA/0.5 mol % | |

| | Reaction Temperature (° C.)/hour | Mw | Mn | Mw/Mn | Tg (° C.) | Median Diameter (nm) | Detected Amount of Catalyst-Originated Metal (ppm) |
|---|---|---|---|---|---|---|---|
| Example 1 | 120/20 hr | 14,150 | 4,780 | 2.96 | 69 | 210 | 0 |
| Example 2 | 120/20 hr | 11,080 | 4,040 | 2.74 | 69 | 200 | 0 |
| Example 3 | 120/20 hr | 14,240 | 4,790 | 2.97 | 70 | 220 | 0 |
| Example 4 | 120/20 hr | 11,090 | 4,100 | 2.70 | 71 | 190 | 0 |
| Example 5 | 120/20 hr | 10,060 | 3,780 | 2.66 | 69 | 190 | 0 |
| Example 6 | 120/20 hr | 18,250 | 6,070 | 3.01 | 60 | 190 | 0 |
| Example 7 | 120/20 hr | 9,980 | 4,040 | 2.47 | 71 | 190 | 0 |
| Comparative Example 1 | 120/20 hr | 21,080 | 5,980 | 3.53 | 42 | 200 | 0 |
| Comparative Example 2 | 120/20 hr | 980 | 899 | 1.10 | not more than room temperature | — | 3,240 |
| Comparative Example 3 | 200/10 hr | 21,600 | 5,810 | 3.72 | 63 | 210 | 2,550 |
| Comparative Example 4 | 120/20 hr | 1,060 | 910 | 1.16 | not more than room temperature | — | 2,780 |
| Comparative Example 5 | 200/10 hr | 21,600 | 5,810 | 3.72 | 70 | 220 | 3,150 |
| Example 13 | rapidly cooled after emulsification | 14,240 | 4,790 | 2.97 | 70 | 200 | 0 |

In producing a toner by using the resin particle liquid dispersion produced above, the following Releasing Agent Particle Liquid Dispersion W1 and colorant particle liquid dispersion (cyan pigment liquid dispersion) are produced.

(Production of Releasing Agent Particle Dispersion)

| | |
|---|---|
| Polyethylene wax (Polywax 725, produced by Toyo-Petrolite K.K., melting temperature: 103° C.) | 30 parts by weight |
| Cationic surfactant (Sanizol B50, produced by Kao Corp.) | 3 parts by weight |
| Ion exchanged water | 67 parts by weight |

These components are thoroughly dispersed by a homogenizer (Ultra-Turrax T50, manufactured by IKA Works, Inc.) under heating at 95° C. and then dispersed by a pressure jet-type homogenizer (Gaulin Homogenizer, manufactured by Gaulin) to prepare Releasing Agent Particle Liquid Dispersion W1. The number average particle diameter D50n of releasing agent particles in the obtained liquid dispersion is 4,600 nm. Thereafter, ion exchanged water is added to adjust the solid concentration of the liquid dispersion to 30%.

(Preperation of Cyan Pigment Liquid Disperion C1)

| | |
|---|---|
| Cyan pigment (C.I. Pigment Blue 15:3, produced by Dainichiseika Color & Chemicals Mfg. Co., Ltd.) | 20 parts by weight |
| Anionic surfactant (Neogen R, produced by Dai-ichi Kogyo Seiyaku Co., Ltd.) | 2 parts by weight |
| Ion exchanged water | 78 parts by weight |

A cyan pigment liquid dispersion is prepared from these components. The number average particle diameter D50n of the pigment in the liquid dispersion is 121 nm. Thereafter, ion exchanged water is added to adjust the solid concentration of the liquid dispersion to 15%. In this way, Cyan Pigment Liquid Dispersion C1 is obtained.

In this Example, the median diameter in each of the releasing agent particle liquid dispersion and the colorant particle liquid dispersion is measured by a laser diffraction-type particle size distribution measuring device (LA-920, manufactured by Horiba Ltd.).

Toner Example (Preparation of Toner Particle 1)

| | |
|---|---|
| Resin Particle Liquid Dispersion 1 | 160 parts by weight |
| Releasing Agent Particle Liquid Dispersion W1 | 33 parts by weight |
| Cyan Pigment Liquid Dispersion C1 | 60 parts by weight |
| An aqueous 10 wt % polyaluminum chloride solution (PAC100W, produced by Asada Kagaku K.K.) | 15 parts by weight |

-continued

| An aqueous 1% nitric acid solution | 3 parts by weight |

These components are dispersed by using a homogenizer (Ultra-Turrax T50, manufactured by IKA Works, Inc.) at 5,000 rpm for 3 minutes in a round-shaped stainless steel-made flask, and then a lid equipped with a stirrer having magnetic seal, a thermometer and a pH meter is mounted on the flask. Thereafter, a mantle heater for heating is set, and the flask is heated to 62° C. at a rate of 1° C./min with stirring at a rotation number appropriately controlled to the minimum level for stirring the entire liquid dispersion in the flask. After keeping at 62° C. for 30 minutes, the particle diameter of aggregate particles is confirmed by a Coulter counter (TA II, manufactured by Beckman-Coulter Corporation). Immediately after the temperature elevation is stopped, 50 parts by weight of Resin Particle Liquid Dispersion 1 is added, and this condition is kept for 30 minutes. Subsequently, an aqueous sodium hydroxide solution is added until the pH of the system became 6.5, and then the system is heated to 97° C. at 1° C./min. After the temperature elevation, an aqueous nitric acid solution is added to adjust the pH of the system to 5.0, and this condition is kept for 10 hours to allow for thermal coalescence of aggregate particles.

Thereafter, the temperature of the system is lowered to 50° C., and an aqueous sodium hydroxide solution is added to adjust the pH to 12.0. After keeping this condition for 10 minutes, the content is taken out from the flask and satisfactorily treated through filtration and washing with flowing water by using ion exchanged water, and the obtained product is further dispersed in ion exchanged water to have a solid content of 10 wt %. Subsequently, a nitric acid is added and after stirring at a pH of 3.0 for 10 minutes, the dispersion is again satisfactorily treated through filtration and washing with flowing water by using ion exchanged water and the obtained slurry is freeze-dried to obtain a cyan toner (Toner C1).

Thereafter, a fine silica ($SiO_2$) particle having an average primary particle diameter of 40 nm subjected to a surface hydrophobing treatment with hexamethyldisilazane (hereinafter sometimes simply referred to as "HMDS"), and a fine metatitanic acid compound particle having an average primary particle diameter of 20 nm as a reaction product of metatitanic acid and isobutyltrimethoxysilane are added each in an amount of 1 wt % to Toner C1 prepared above, and these are mixed in a Henschel mixer to produce a cyan external addition toner.

The particle diameter of the thus obtained toner particle is measured by a Coulter counter, as a result, the volume average particle diameter ($D_{50}$) is 4.56 μm, and the volume average particle size distribution index GSDv is 1.20. Also, the shape factor SF1 of the toner particle determined by observing the shape by means of Luzex is 135, indicating a potato shape.

(Toner Examples 2 to 7 and 8)

(Cyan toners are obtained in the same manner as in Toner Example 1 except for changing the resin particle liquid dispersion to Resin Particle Liquid Dispersions 2 to 7 and 13, respectively, and measured on the volume average particle diameter ($D_{50}$), the volume average particle size distribution index GSDv and the shape factor. Similarly to Toner Example 1, external additives are externally added to each toner to obtain a cyan external addition toner.

(Toner Comparative Examples 1 to 3)

Cyan toners are obtained in the same manner as in Toner Example 1 except for changing the resin particle liquid dispersion to Resin Particle Liquid Dispersions 8, 10 and 12, respectively, and measured on the volume average particle diameter ($D_{50}$) (i.e., cumulative volume average particle diameter $D_{50}$), the volume average particle size distribution index GSDv and the shape factor. Similarly to Toner Example 1, external additives are externally added to each toner to obtain a cyan external addition toner.

(Production of Carrier)

A methanol solution containing 0.1 part by weight of γ-aminopropyltriethoxysilane is added to 100 parts by weight of a fine Cu—Zn ferrite particle having a volume average particle diameter of 40 μm and after coating the particle in a kneader, methanol is removed by distillation. The obtained silane compound is heated at 120° C. for 2 hours and thereby completely hardened. To this particle, a solution obtained by dissolving a perfluorooctylethyl methacrylate-methyl methacrylate copolymer (copolymerization ratio: 40:60) in toluene is added. The resulting mixture is treated by using a vacuum kneader to produce a resin-coated carrier in which the coverage of the perfluorooctylethyl methacrylate-methyl methacrylate copolymer is 0.5 wt %.

(Production of Developer)

In a V-blender, 8 parts by weight of each of the toners produced above and 100 parts by weight of the resin-coated carrier are charged and mixed to produce an electrostatic image developer.

(Evaluation of Toner and Image Quality)

(1) Evaluation of Tribo-Charged Amount 1.5 Parts by weight of the toner and 30 parts by weight of a carrier (a carrier for Docu Centre Color 500, produced by Fuji Xerox Co., Ltd.) are left standing for a day and a night in a high-temperature high-humidity (temperature: 28° C., humidity: 85%) environment. Thereafter, these toner and carrier are mixed and stirred for 60 minutes and the tribo-charged amount (tribo TV value) is measured by a blow off tribo measuring apparatus.

The evaluation is performed according to the following criteria:

A: Tribo-charged amount of 31 (μC/g) or more.
B: Tribo-charged amount of 29 to 31 (μC/g).
C: Tribo-charged amount of 29 (unit: μC/g) or less.

(2) Evaluation of Mechanical Strength

A developing machine for a full-color copier Docu Centre Color 500 manufactured by Fuji Xerox Co., Ltd. is modified to be drivable by itself and after charging the developer produced in the same manner as in (1) above thereinto, the developing machine is driven under the same conditions as in the copier. In this operation, the developer in the developing machine is sampled at an arbitrary time, and the particle size distribution of the toner is measured by a Coulter counter (TA II, manufactured by Beckman-Coulter Corporation). The driving time (hour (h)) and the cumulative total value (%) of 3.0 μm or less in the number average distribution are plotted on the X axis and the Y axis, respectively, and by defining the gradient as the mechanical strength index, the mechanical strength is evaluated by its numerical value. As this numerical value is larger, fracture is more readily generated in the developing machine, indicating that the mechanical strength is low.

A: Mechanical strength index is 0.20 or less.
B: Mechanical strength index is 0.21 to 0.30.
C: Mechanical strength index is 0.30 or more.

(3) Evaluation of Fixing Property

In the evaluation of fixing property and image quality with the use of a developer produced in the same manner as in (1) above, image formation is performed by using a modified Docu Centre Color 500CP manufactured by Fuji Xerox Co., Ltd., and the fixing temperature and initial image quality are evaluated. As for the evaluation items, the minimum temperature of a heat roller at which the toner particle forms a continuous film layer is used for the minimum fixing temperature, the minimum temperature allowing for occurrence of a hot offset phenomenon is used for the hot offset generation temperature, and the image quality characteristic is evaluated by judging the image quality unevenness with an eye.

a. Offset Generation Temperature

In the measurement of the offset generation temperature, an operation of preparing an unfixed image by the copier above, transferring the toner image with adjustment to give a solid image of 5 cm×5 cm having a toner coverage of 1.2 mg/cm², fixing it by the fixing device above, feeding a white transfer sheet to the fixing device under the same conditions, and observing with an eye whether the toner staining is generated or not, is repeated in the state that the set temperature of the heat roller of the fixing device is sequentially elevated by steps of 5° C. The minimum set temperature of causing toner staining is used for the offset generation temperature. Incidentally, the paper sheet used here is Bright Recycled Paper (AT801) produced by Fuji Xerox Co., Ltd., and the process speed is 100 mm/second. That is, the offset generation is evaluated under the conditions of more readily causing the generation than in the actual machine.

A: No offset generation at 220° C.
B: Offset generation temperature is 215 to 220° C.
C: Offset generation temperature is 200 to 210° C.
D: Offset generation temperature is 195° C. or less.

b. Image Quality Characteristic (Evaluation of Fogging)

The image quality after fixing a fine line image is evaluated by measuring the non-image area between fine lines by means of a reflection densitometer (X-Rite 404, manufactured by U.S. X-Rite). The image quality is rated B when the reflection density had a density increase of 0.01 or more in the background fogging, and rated A when 0.01 or less.

c. Evaluation of Image Strength Against Rubbing

The image strength against rubbing is measured by using an automatic original feeding device of the modified Docu Center Color 500CP manufactured by Fuji Xerox Co., Ltd.). Five original sheets are set in the automatic original feeding device and fed, and the back staining of the second and subsequent original sheets is confirmed with an eye and graded (A indicates a level of causing no problem in practical use).

A: No generation of back staining, or staining difficult to confirm with an eye.
B: Staining confirmable with an eye is generated.
C: Serious staining completely confirmable with an eye is generated.

(4) Heat Storability of Toner

The toner is stored in a packaging container for 24 hours under the storage temperature condition of 50° C. in the open state, and 20 g of the toner is sampled. The sampled toner is placed on a mesh having a pore diameter of 45 μm and sieved while applying vibration for 90 seconds. The amount of the toner remaining on the mesh is measured as the percentage to the entire toner amount (20 g).

The results are judged according to the following criteria.
A: Residual ratio of 9% or less.
B: Residual ratio of 9 to 11%.
C: Residual ratio of 11% or more.

The evaluation results are shown in the Table below.

TABLE 2

| | Resin Used | $D_{50}$ (μm) | GSDv | Shape Factor | Charged Amount (TV value) | Mechanical Strength | Offset Generation Temperature (° C.) | Image Quality Characteristic | Image Strength | Heat Storability |
|---|---|---|---|---|---|---|---|---|---|---|
| Toner Example 1 | 1 | 4.56 | 1.20 | 135 | A (36) | A (0.09) | B (215) | A | A | A (4.6) |
| Toner Example 2 | 2 | 4.41 | 1.20 | 123 | A (34) | A (0.03) | A (≧220) | A | A | A (5.7) |
| Toner Example 3 | 3 | 4.59 | 1.20 | 131 | A (36) | A (0.07) | A (≧220) | A | A | A (4.1) |
| Toner Example 4 | 4 | 4.72 | 1.20 | 127 | A (38) | A (0.07) | B (215) | A | A | A (5.0) |
| Toner Example 5 | 5 | 4.87 | 1.20 | 124 | A (38) | A (0.07) | A (≧220) | A | A | A (5.4) |
| Toner Example 6 | 6 | 4.61 | 1.20 | 132 | A (38) | A (0.07) | A (≧220) | A | A | A (6.9) |
| Toner Example 7 | 7 | 4.76 | 1.20 | 133 | A (38) | A (0.07) | B (225) | A | A | A (4.1) |
| Toner Comparative Example 1 | 8 | 4.63 | 1.20 | 122 | A (37) | B (0.25) | D (195) | A | C | C (11.6) |
| Toner Comparative Example 2 | 10 | 4.45 | 1.20 | 134 | C (27) | A (0.07) | A (≧220) | B | B | A (6.8) |
| Toner Comparative Example 3 | 12 | 4.55 | 1.20 | 130 | C (27) | A (0.07) | A (≧220) | B | B | A (7.8) |
| Toner Example 8 | 13 | 4.70 | 1.20 | 124 | A (38) | A (0.07) | A (≧220) | A | A | A (6.4) |

According to an exemplary embodiment of the present invention, by employing the above-described constitutions, an electrostatic image developing toner or electrostatic image developer ensuring excellent image quality in the high-temperature high-humidity condition, and a binder resin for the development of an electrostatic image, which is suitably used in the toner or developer, can be provided. Also, by using the electrostatic image developing toner, an image forming method assured of excellent image strength can be provided.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

This application claims priority under 35 USC 119 from Japanese patent document, 2005-371726, the disclosure of which is incorporated by reference herein.

What is claimed is:

1. A binder resin for an electrostatic image developing toner, obtained by a polycondensation reaction of a polycarboxylic acid and a polyol, wherein the polycarboxylic acid comprises a compound represented by at least one of formula (1) and formula (2) in an amount of from about 50 to about 100 mol %;

the polyol comprises a compound represented by formula (3) in an amount of from about 10 to about 100 mol %; and a content of a catalyst-originated metal element in the binder resin is about 100 ppm or less:

$$R^1OOCA^1_mB^1_nA^1_lCOOR^{1'} \quad (1)$$

wherein $A^1$ represents a methylene group;
$B^1$ represents an aromatic hydrocarbon group;
$R^1$ and $R^{1'}$ each independently represents a hydrogen atom or a monovalent hydrocarbon group;
m and l each independently represents an integer satisfying $1 \leq m+l \leq 12$; and
n represents an integer satisfying $1 \leq n \leq 3$;

$$R^2OOCA^2_pB^2_qA^2_rCOOR^{2'} \quad (2)$$

wherein $A^2$ represents a methylene group;
$B^2$ represents an alicyclic hydrocarbon group;
$R^2$ and $R^{2'}$ each independently represents a hydrogen atom or a monovalent hydrocarbon group; and
p, q and r each independently represents an integer satisfying $0 \leq p \leq 6$, $0 \leq r \leq 6$ and $1 \leq q \leq 3$, respectively;

$$HOX_h\text{-}Ph\text{-}Y\text{-}Ph\text{-}X_kOH \quad (3)$$

wherein X represents an alkylene oxide group;
Y represents $SO_2$ or $C_6H_{10}$; and
h and k each independently represents an integer satisfying $1 \leq h \leq 3$ and $1 \leq k \leq 3$, respectively.

2. The binder resin for an electrostatic image developing toner according to claim 1,
wherein in formula (1), m and l are the same number.

3. The binder resin for an electrostatic image developing toner according to claim 1,
wherein in formula (3), h and k are the same number.

4. The binder resin for an electrostatic image developing toner according to claim 3,
wherein the compound represented by formula (3) is at least one of a bisphenol S derivative and a bisphenol Z derivative.

5. The binder resin for an electrostatic image developing toner according to claim 1,
wherein the polycondensation reaction of a polycarboxylic acid and a polyol is performed with a sulfur acid.

6. The binder resin for an electrostatic image developing toner according to claim 5,
wherein the sulfur acid is an organic sulfur acid having a surface activating effect.

7. The binder resin for an electrostatic image developing toner according to claim 6,
wherein the organic sulfur acid having a surface activating effect is a dodecylbenzenesulfonic acid.

8. An electrostatic image developing toner produced by kneading and pulverizing a mixture comprising a binder resin for an electrostatic image developing toner according to claim 1.

9. An electrostatic image developer comprising an electrostatic image developing toner according to claim 8 and a carrier.

10. An image forming method comprising:
forming an electrostatic latent image on a surface of a latent image-holding member;
developing the electrostatic latent image formed on the surface of the latent image-holding member with an electrostatic image developer to form a toner image;
transferring the toner image formed on the surface of the latent image-holding member to a surface of a transferee member; and
heat-fixing the toner image transferred to the surface of the transferee member,
wherein the electrostatic image developer is an electrostatic image developer according to claim 9.

11. An image forming method comprising:
forming an electrostatic latent image on a surface of a latent image-holding member;
developing the electrostatic latent image formed on the surface of the latent image-holding member with a toner to form a toner image;
transferring the toner image formed on the surface of the latent image-holding member to a surface of a transferee member; and
heat-fixing the toner image transferred to the surface of the transferee member,
wherein the toner is an electrostatic image developing toner according to claim 8.

12. A process for producing a binder resin for an electrostatic image developing toner, the process comprising:
polycondensing a polycarboxylic acid and a polyol,
wherein the polycarboxylic acid comprises a compound represented by at least one of formula (1) and formula (2) in an amount of from about 50 to about 100 mol %;
the polyol comprises a compound represented by formula (3) in an amount of from about 10 to about 100 mol %; and
a content of a catalyst-originated metal element in the binder resin is about 100 ppm or less:

$$R^1OOCA^1_mB^1_nA^1_lCOOR^{1'} \quad (1)$$

wherein $A^1$ represents a methylene group;
$B^1$ represents an aromatic hydrocarbon group;
$R^1$ and $R^{1'}$ each independently represents a hydrogen atom or a monovalent hydrocarbon group;
m and l each independently represents an integer satisfying $1 \leq m+l \leq 12$; and
n represents an integer satisfying $1 \leq n \leq 3$;

$$R^2OOCA^2_pB^2_qA^2_rCOOR^{2'} \quad (2)$$

wherein $A^2$ represents a methylene group;
$B^2$ represents an alicyclic hydrocarbon group;
$R^2$ and $R^{2'}$ each independently represents a hydrogen atom or a monovalent hydrocarbon group; and
p, q and r each independently represents an integer satisfying $0 \leq p \leq 6$, $0 \leq r \leq 6$ and $1 \leq q \leq 3$, respectively;

$$HOX_h\text{-}Ph\text{-}Y\text{-}Ph\text{-}X_kOH \quad (3)$$

wherein X represents an alkylene oxide group;
Y represents $SO_2$ or $C_6H_{10}$; and
h and k each independently represents an integer satisfying $1 \leq h \leq 3$ and $1 \leq k \leq 3$, respectively.

13. The process for producing a binder resin for an electrostatic image developing toner according to claim 12,
wherein the polycondensation reaction of a polycarboxylic acid and a polyol is performed with a sulfur acid.

14. The process for producing a binder resin for an electrostatic image developing toner according to claim 13, wherein the sulfur acid is an organic sulfur acid having a surface activating effect.

15. The process for producing a binder resin for an electrostatic image developing toner according to claim 14,
wherein the organic sulfur acid having a surface activating effect is a dodecylbenzenesulfonic acid.

16. The process for producing a binder resin for an electrostatic image developing toner according to claim 12, which further comprises:
rapidly cooling a resin after polymerization at about 1 to about 50° C./min.

17. A binder resin liquid dispersion for an electrostatic image developing toner, comprising:
a binder resin for an electrostatic image developing toner dispersed in the binder resin liquid dispersion,
wherein the binder resin is obtained by a polycondensation reaction of a polycarboxylic acid and a polyol,
wherein the polycarboxylic acid comprises a compound represented by at least one of formula (1) and formula (2) in an amount of from about 50 to about 100 mol %;
the polyol comprises a compound represented by formula (3) in an amount of from about 10 to about 100 mol %; and
a content of a catalyst-originated metal element in the binder resin is about 100 ppm or less:

$$R^1OOCA^1_m B^1_n A^1_l COOR^{1'} \quad (1)$$

wherein $A^1$ represents a methylene group;
$B^1$ represents an aromatic hydrocarbon group;
$R^1$ and $R^{1'}$ each independently represents a hydrogen atom or a monovalent hydrocarbon group;
m and l each independently represents an integer satisfying $1 \leq m+l \leq 12$; and
n represents an integer satisfying $1 \leq n \leq 3$;

$$R^2OOCA^2_p B^2_q A^2_r COOR^{2'} \quad (2)$$

wherein $A^2$ represents a methylene group;
$B^2$ represents an alicyclic hydrocarbon group;
$R^2$ and $R^{2'}$ each independently represents a hydrogen atom or a monovalent hydrocarbon group; and
p, q and r each independently represents an integer satisfying $0 \leq p \leq 6$, $0 \leq r \leq 6$ and $1 \leq q \leq 3$, respectively;

$$HOX_h\text{-Ph-Y-Ph-}X_k OH \quad (3)$$

wherein X represents an alkylene oxide group;
Y represents $SO_2$ or $C_6H_{10}$; and
h and k each independently represents an integer satisfying $1 \leq h \leq 3$ and $1 \leq k \leq 3$, respectively.

18. A process for producing an electrostatic image developing toner, comprising:
aggregating a binder resin in a liquid dispersion comprising at least a binder resin liquid dispersion to obtain aggregate particles; and
heating and coalescing the aggregate particles,
wherein the binder resin liquid dispersion is a binder resin liquid dispersion for an electrostatic image developing toner according to claim 17.

19. An electrostatic image developing toner produced by a process according to claim 18.

* * * * *